United States Patent
Inagaki et al.

(10) Patent No.: US 11,934,577 B2
(45) Date of Patent: Mar. 19, 2024

(54) FEEDBACK SYSTEM, FEEDBACK CONTROL METHOD, AND ELECTRONIC DEVICE

(71) Applicant: Sony Group Corporation, Tokyo (JP)

(72) Inventors: Takeo Inagaki, Tokyo (JP); Kazuma Takahashi, Tokyo (JP); Miyuki Shirakawa, Toyko (JP)

(73) Assignee: Sony Group Corporation, Tokyo (JP)

( * ) Notice: Subject to any disclaimer, the term of this patent is extended or adjusted under 35 U.S.C. 154(b) by 54 days.

(21) Appl. No.: 17/290,391

(22) PCT Filed: Oct. 3, 2019

(86) PCT No.: PCT/JP2019/039040
§ 371 (c)(1),
(2) Date: Apr. 30, 2021

(87) PCT Pub. No.: WO2020/116010
PCT Pub. Date: Jun. 11, 2020

(65) Prior Publication Data
US 2021/0405755 A1 Dec. 30, 2021

(30) Foreign Application Priority Data
Dec. 7, 2018 (JP) .................................. 2018-229517

(51) Int. Cl.
*G06F 3/01* (2006.01)
*A41D 1/00* (2018.01)
(Continued)

(52) U.S. Cl.
CPC ............ *G06F 3/016* (2013.01); *A41D 1/002* (2013.01); *A43B 3/34* (2022.01); *G05D 23/1917* (2013.01);
(Continued)

(58) Field of Classification Search
CPC .......... G06F 3/014–016; G05D 23/192; G05D 23/1917; A41D 1/002; A43B 3/34
See application file for complete search history.

(56) References Cited

U.S. PATENT DOCUMENTS 6,113,263 A * 9/2000 Satoh ..................... G01K 13/06
374/185
10,388,123 B2 * 8/2019 Alghooneh ............. G06F 3/016
(Continued)

FOREIGN PATENT DOCUMENTS

| JP | 2010-512189 A | 4/2010 |
|---|---|---|
| JP | 2018-109999 A | 7/2018 |
| WO | WO2016153618 A1 | 9/2016 |

OTHER PUBLICATIONS

International Search Report issued in International Patent Application No. PCT/JP2019/039040 dated Dec. 17, 2019 and English translation of same. 4 pages.
(Continued)

Primary Examiner — Albert K Wong
(74) Attorney, Agent, or Firm — K&L Gates LLP

(57) ABSTRACT

An electronic device includes one or more deformable interfaces which are able to pressurize a part of a user operating, in an actual environment, an operation target moving in a different environment and of which shapes are changeable; and one or more temperature changing units which are able to change a temperature perceived by the part of the user. A feedback system includes the electronic device; an actuator control unit configured to control an operation of an actuator that changes the shape of the deformable interface based on a change in a tactile sensation estimated to be obtained by the operation target; and a temperature control unit configured to control the temperature of the temperature changing unit capable of changing a temperature perceived by the part of the user based on a
(Continued)

change in temperature estimated to be perceived by the operation target.

20 Claims, 34 Drawing Sheets

(51) Int. Cl.
    *A43B 3/34*     (2022.01)
    *G05D 23/19*     (2006.01)
    *A63F 13/28*     (2014.01)

(52) U.S. Cl.
    CPC ........... *G05D 23/192* (2013.01); *G06F 3/014* (2013.01); *G06F 3/015* (2013.01); *A63F 13/28* (2014.09)

(56) References Cited

U.S. PATENT DOCUMENTS

| | | | |
|---|---|---|---|
| 10,509,474 B2* | 12/2019 | Levesque | G06F 3/011 |
| 10,678,334 B1* | 6/2020 | Pezent | G06F 3/0346 |
| 2016/0274662 A1 | 9/2016 | Rimon et al. | |
| 2017/0192510 A1* | 7/2017 | Ullrich | G06F 3/04845 |
| 2017/0212593 A1 | 7/2017 | Gustin | |
| 2018/0190087 A1 | 7/2018 | Maalouf et al. | |

OTHER PUBLICATIONS

Written Opinion issued in International Patent Application No. PCT/JP2019/039040 dated Dec. 17, 2019. 6 pages.

* cited by examiner

FEEDBACK SYSTEM, FEEDBACK CONTROL METHOD, AND ELECTRONIC DEVICE

TECHNICAL FIELD

The technology according to the present disclosure (the present technology) relates to, for example, an electronic device fitted on a wearing object worn on a human body, a feedback system including the electronic device, and a feedback control method using the electronic device.

BACKGROUND ART

For example, as disclosed in PTL 1, an electronic device feeds a change in a tactile sensation back to a user by selectively operating a plurality of air pressure generation devices, the air pressure generation devices being contained in a vest worn by the user.

CITATION LIST

Non Patent Literature

[PTL 1] JP 2010-512189 T

SUMMARY

Technical Problem

However, in the technology disclosed in PTL 1, for example, there is a problem that when a change in temperature under a different environment such as a virtual environment occurs, it is difficult to feed the occurring change in the temperature back to a user.

The present technology has been devised in view of the foregoing problem and an objective of the present technology is to provide an electronic device capable of feeding changes in a tactile sensation and a temperature back to a user, a feedback system including the electronic device, and a feedback control method using the electronic device.

Solution to Problem

According to an aspect of the present technology, a feedback system includes: a deformable interface, an actuator control unit, a temperature changing unit, and a temperature control unit. The deformable interface is able to pressurize a part of a user operating, in an actual environment, an operation target moving in a different environment. The actuator control unit controls an operation of an actuator changing a shape of the deformable interface on the basis of a change in a tactile sensation estimated to be obtained by the operation target. The temperature changing unit is able to change a temperature perceived by the part of the user. The temperature control unit controls a temperature of the temperature changing unit on the basis of a change in temperature estimated to be perceived by the operation target.

According to another aspect of the present technology, a feedback control method includes: controlling an operation of an actuator that changes a shape of a deformable interface that is able to pressurize a part of a user operating, in an actual environment, an operation target moving in a different environment based on a change in a tactile sensation estimated to be obtained by the operation target. In addition to this, the feedback control method includes controlling a temperature of a temperature changing unit that is able to change a temperature perceived by the part of the user based on a change in temperature estimated to be perceived by the operation target.

According to still another aspect of the present technology, an electronic device includes: one or more deformable interfaces of which a shape is changeable; and one or more temperature changing units of which a temperature is changeable. The deformable interface is able to pressurize a part of a user operating, in an actual environment, an operation target moving in a different environment. The temperature changing unit is able to change a temperature perceived by the part of the user.

DESCRIPTION OF EMBODIMENTS

Figure 1:
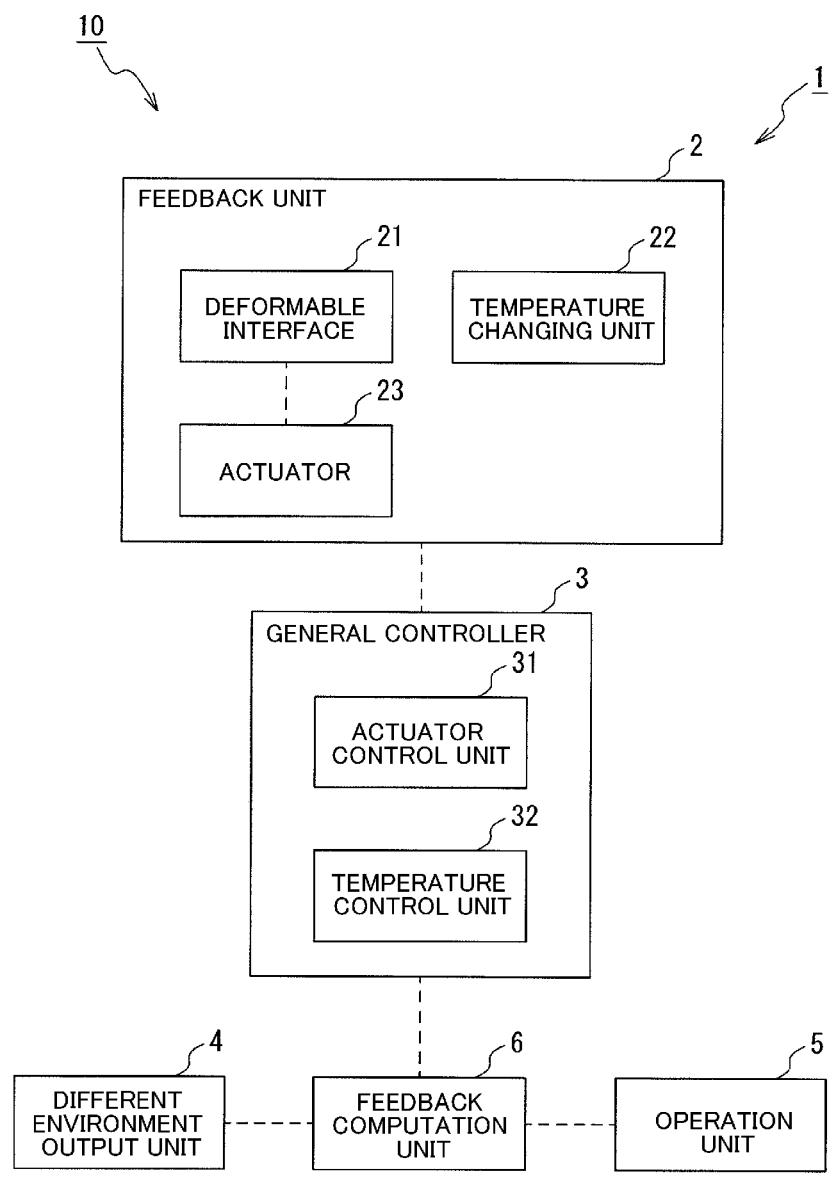
FIG. 1 is a block diagram illustrating configurations of an electronic device and a feedback system according to a first embodiment.

Hereinafter, embodiments of the present technology will be described with reference to the drawings. In the drawings to be described, the same or similar reference numerals are given to the same or similar portions and repeated description thereof will be omitted. Each drawing is schematic and the realities are different from the reality in some cases. In the embodiments to be described below, devices or methods are exemplary in order to embody the technical ideas of the present technology. The technical ideas of the present technology do not specify devices or methods exemplified in the following embodiments. The technical ideas of the present technology can be changed in various forms within the technical scope described in the claims.

First Embodiment

<Configuration of Feedback System>

A feedback system 10 according to a first embodiment includes an electronic device 1, as illustrated in FIG. 1.

The feedback system 10 is a system that feeds changes in a tactile sensation and a temperature back to a user operating, in the actual environment, an operation target (character) which is in a different environment such as a virtual environment. In the first embodiment, a case in which the different environment is a game (video game) in which an operation target is displayed on a display will be described as an example.

Here, the "operation target" is a person who appears in a game, a person who appears in a movie, or an indication or an object, such as a tele-existence of a virtual tour, which is in a different environment such as a virtual environment or a remote location and is operating in response to an intention of a user. The tele-existence is a robot which is remotely operated by a user in a remote location.

<Configuration of Electronic Device>

As illustrated in FIG. 1, the electronic device 1 includes a plurality of feedback units 2, a general controller 3, a different environment output unit 4, an operation unit 5, and a feedback computation unit 6. In FIG. 1, only one unit is illustrated among the plurality of feedback unit 2.

In the first embodiment, a case in which the plurality of feedback units 2, the general controller 3, the different environment output unit 4, the operation unit 5, and the feedback computation unit 6 are all worn on the body of a user to realize a self-contained configuration will be described as an example.

Figure 2:
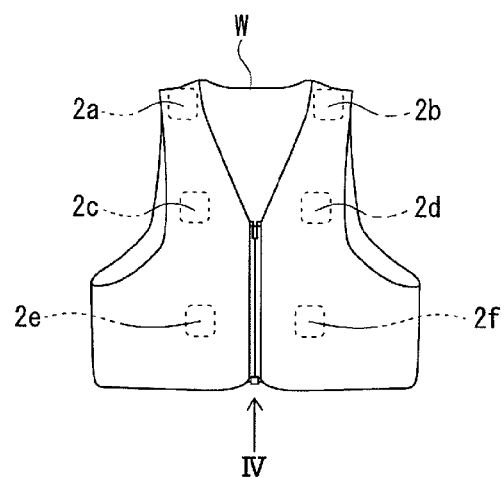
FIG. 2 is a diagram illustrating clothing when viewed from the front side.
Figure 3:
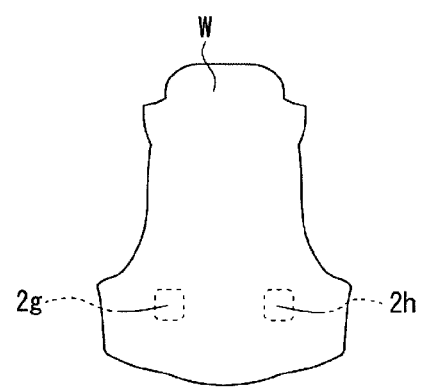
FIG. 3 is a diagram illustrating the clothing when viewed from the back side.
Figure 4:
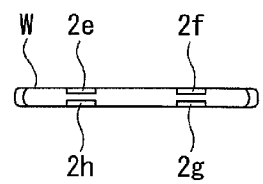
FIG. 4 is a diagram along the line IV line of FIG. 2.

The plurality of feedback units 2 are fitted on a surface (an inner surface) facing the user in clothing W worn by the user, as illustrated in FIGS. 2 to 4.

In the first embodiment, a case in which the clothing W on which the plurality of feedback units 2 are fitted is a vest worn on the upper half part of the user will be described. In the first embodiment, a case in which eight feedback units 2 are fitted on the clothing W will be described.

In the first embodiment, a case in which a shape of a portion of the feedback unit 2 facing the user is a square of which the lengths of two orthogonal sides are both set to 2.5 [cm] will be described.

Of the eight feedback units 2, six feedback units 2 are disposed in two right and left portions when a median line of the shoulder, the chest, and the abdomen of the user is set as a reference. In addition to this, of the eight feedback units 2, two feedback units 2 are disposed on the back of the user at positions facing two feedback units 2 disposed on the abdomen of the user when the median line of the user is a reference. Accordingly, of the eight feedback units 2, two pairs of four feedback units 2 are disposed at positions interposing the upper half part of the user in the front and rear directions. In the drawing, of the eight feedback units 2, six feedback units 2 disposed on the front surface are denoted by reference numerals 2a to 2f. Similarly, in the drawing, of the eight feedback units 2, two feedback units 2 disposed on the rear surface are denoted by reference numerals 2g and 2h. In the drawing, two pairs of four feedback units 2 are denoted by reference numerals 2e to 2h.

The feedback unit 2 includes one deformable interface 21 and one temperature changing unit 22 that are capable of operating in connection with each other.

The deformable interface 21 is formed of, for example, an elastic material such as silicone in a hexahedral case shape.

The deformable interface 21 includes an actuator 23 that changes the shape of the deformable interface 21.

The actuator 23 is formed to include, for example, an air pump and changes the shape of the deformable interface 21 by a fluid (a gas). That is, the actuator 23 is a fluid actuator.

As described above, the deformable interface 21 is worn on a pre-set part of the user and can pressurize the part of the user. In the first embodiment, the deformable interface 21 is disposed at a position at which the upper half part of the user is pressurized and can pressurize the upper half part of the user.

That is, the plurality of deformable interfaces 21 and the plurality of temperature changing units 22 are disposed on each of the front surface and the rear surface of the upper half part of the user and can pressurize the front surface and the rear surface of the upper half part.

The deformable interface 21 is fitted on the clothing W worn by the user.

The temperature changing unit 22 is formed to include, for example a Peltier element or a nichrome wire and can change a temperature by electrically adjusting a temperature. Accordingly, the temperature changing unit 22 is fitted on a pre-set part of the user and can change a temperature.

In the first embodiment, a configuration of the temperature changing unit 22 including a Peltier element will be described.

The temperature changing unit 22 is disposed at a position closer to the user than the deformable interface 21.

The general controller 3 includes an actuator control unit 31 and a temperature control unit 32.

The actuator control unit 31 is formed to include, for example, a CPU and a memory and controls an operation of the actuator 23 in accordance with a signal input from the feedback computation unit 6. A process performed by the actuator control unit 31 in accordance with a signal input from the feedback computation unit 6 will be described later.

The temperature control unit 32 is formed to include, for example, a CPU and a memory and controls an operation of the temperature changing unit 22 in accordance with a signal input from the feedback computation unit 6. An operation performed by the temperature control unit 32 in accordance with a signal input from the feedback computation unit 6 will be described later.

The different environment output unit 4 is formed using, for example, goggles (a VR goggle) including a head-mounted display or a display installed on a wall surface or the like and outputs a different environment (a video and sound). In the first embodiment, as described above, since the different environment output unit 4 is configured to be worn on the body of a user, the different environment output unit 4 is formed using goggles including head-mounted displays.

For example, the head-mounted display displays an image which can be viewed with two eyes or one eye of the user because a display that displays an image is disposed on a part of goggles or a hat. As an image displayed using the head-mounted display, for example, an image of a virtual space or an image captured by a camera can be used.

For example, the operation unit 5 is formed to include a lever, a button, or the like and is used for the user to operate an operation target under the actual environment.

In the first embodiment, a case in which the operation unit 5 is configured such that a lever or a button is fitted on a controller held by a hand of the user will be described.

The feedback computation unit 6 is formed to include, for example, a CPU and a memory. The feedback computation unit 6 computes a control signal for controlling an operation of the actuator 23 and an operation of the temperature changing unit 22 in accordance with the different environment output from the different environment output unit 4 and an operation target state operated using the operation unit 5.

Hereinafter, an example of computation performed by the feedback computation unit 6 will be described.

First, a case in which the different environment output from the different environment output unit 4 is an environment in which arrows, bullets, artillery balls, and the like fly about (a battlefield or the like) and the operation target is a person appearing in a game will be described.

A case in which a flying object such as an arrow, a bullet, a shell splinter of an artillery ball, or the like collides with the upper half part of an operation target in the different environment will be described.

In this case, the feedback computation unit 6 computes a control signal so that the deformable interface 21 disposed at a position with which a flying object collides or a position close to the position with which the flying object collides is inflated.

In addition to this, the feedback computation unit 6 computes a control signal so that a temperature of the temperature changing unit 22 disposed at a position with which a flying object collides or a position close to the position with which the flying object collides is increased.

For example, when a plurality of flying objects such as shell splinters of an artillery ball collide with the upper half part of the operation target in the different environment, a control signal is computed so that the plurality of deformable interfaces 21 are inflated and temperatures of the plurality of temperature changing units 22 are increased.

Next, a case in which a flying object penetrates through an upper half part of an operation target in the different environment will be described.

In this case, the feedback computation unit 6 computes a control signal so that the deformable interface 21 disposed at a position of an entrance through which the flying object penetrates or a position close to the entrance through which the flying object penetrates (hereinafter referred to as an "entrance") is inflated. Further, the feedback computation unit 6 computes a control signal so that the deformable interface 21 disposed at a position of an exit through which the flying object penetrates or a position close to the exit through which the flying object penetrates (hereinafter referred to as an "exit") is inflated.

At this time, the feedback computation unit 6 computes a control signal so that the deformable interface 21 disposed at the exit is inflated after the deformable interface 21 disposed at the entrance is inflated.

In addition to this, the feedback computation unit 6 computes a control signal so that the temperature of the temperature changing unit 22 disposed at the exit is increased after the temperature of the temperature changing unit 22 disposed at the entrance is increased.

In this case, for example, a control signal is computed so that the deformable interface 21 included in the feedback unit 2g is inflated after the deformable interface 21 included in the feedback unit 2f is inflated. Further, a control signal is computed so that the temperature of the temperature changing unit 22 included in the feedback unit 2g is increased after the temperature of the temperature changing unit 22 included in the feedback unit 2f is increased.

Next, a case in which the different environment output from the different environment output unit 4 is an environment (a battlefield or the like) in which there is an operation target imitating another person holding a weapon such as a sword or a stick (hereinafter referred to as an enemy character) will be described.

A case in which the upper half part of the operation target is collided and slashed off by a weapon in the different environment will be described.

In this case, the feedback computation unit 6 computes a control signal so that the deformable interface 21 disposed at a position with which a weapon first collides or a position close to the position with which the weapon first collides (hereinafter referred to as an initial position) is inflated.

Further, the feedback computation unit 6 computes a control signal so that the deformable interface 21 disposed at a position with which a weapon finally collides or a position close to the position with which the weapon finally collides (hereinafter, a final position) is inflated.

In this case, for example, a control signal is computed so that the deformable interface 21 included in the feedback unit 2e is inflated after the deformable interface 21 included in the feedback unit 2f is inflated.

As described above, the actuator control unit 31 controls an operation of the actuator 23 including the deformable interface 21 based on a change in a tactile sensation estimated to be obtained by the operation target. The temperature control unit 32 controls the temperature of the temperature changing unit 22 based on a change in temperature estimated to be perceived by the operation target.

Here, when an operation target inside a screen displayed on a display is touched with an object and the operation target is assumed to be replaced with the user, the "tactile sensation estimated to be obtained by the operation target" is, for example, a tactile sensation estimated to be visually felt by the user. The tactile sensation estimated to be obtained by the operation target can be set in accordance with, for example, a speed or a size (mass) of an object touched with the operation target, a contact area of the operation target and the object, or the like.

The "temperature estimated to be perceived by the operation target" is, for example, a temperature estimated to be visually felt by the user when the operation target is touched with the object inside the screen, or a surrounding environment of the operation target is changed, and the operation target is assumed to be replaced with the user. The temperature estimated to be perceived by the operation target can be set in accordance with, for example, a duration of a time in which the operation target is touched with the object, a change in the temperature occurring in the surrounding environment of the operation target, or the like.

Further, the actuator control unit 31 individually controls an operation of the actuator 23 included in the deformable interface 21 with regard to the plurality of deformable interfaces 21. Similarly, the temperature control unit 32 individually controls the temperature of the plurality of temperature changing units 22.

<Feedback Control Method>

In a feedback control method performed using the feedback system 10 according to the first embodiment, an operation of the actuator 23 is controlled based on a change in a tactile sensation estimated to be obtained by the operation target in the different environment. In addition to this, the temperature of the temperature changing unit 22 is controlled based on the change in the temperature estimated to be perceived by the operation target in the different environment.

In the configuration of the first embodiment, the actuator control unit 31 controls an operation of the actuator 23 based on the change in the tactile sensation estimated to be obtained by the operation target in the different environment. In addition to this, the temperature control unit 32 controls the temperature of the temperature changing unit 22 based on the change in the temperature estimated to be perceived by the operation target in the different environment. Thus, it is possible to provide the electronic device 1 capable of feeding the changes in the tactile sensation and the temperature occurring in the operation target in the different environment back to the upper half part of the user.

In the configuration of the first embodiment, it is possible to provide the feedback system 10 including the electronic device 1 capable of feeding changes in a tactile sensation and a temperature occurring in the operation target in the different environment back to the upper half part of the user.

In the configuration of the first embodiment, it is possible to provide the feedback control method using the electronic device 1 capable of feeding changes in a tactile sensation and a temperature occurring in the operation target in the different environment back to the upper half part of the user.

In the configuration of the first embodiment, it is possible to simultaneously feed changes in a tactile sensation and a temperature occurring in the operation target in the different environment back to the user.

In the configuration of the first embodiment, it is possible to feed changes in a tactile sensation and a temperature occurring in the operation target in the different environment back to the user at different timings.

Therefore, it is possible to feed a state in which the user feels a change in a tactile sensation and then feels a change in temperature (for example, a state in which an arm is caught by another person and then heat from an arm of the other person is transmitted) such as a situation occurring in the actual environment back to the user.

By performing control such that the deformable interfaces 21 are inflated and control such that the temperatures of the temperature changing units 22 are changed in the plurality of feedback units 2 at different timings, for example, it is possible to feed a situation in which hail is falling back to the user.

In the configuration of the first embodiment, because the actuator 23 is formed including an air pump and the shape of the deformable interface 21 is changed by a gas, it is possible to vibrate the deformable interface 21 with a low frequency. Thus, it is possible to present the user a tactile sensation such as softness.

In the configuration of the first embodiment, the shape of the deformable interface 21 is changed by a fluid. Therefore, for example, when a flying object collides with an operation target in the different environment, various tactile sensations or new sensations such as a sense of reception of pressure (a pressure sensation) in addition to a sense of touch with an object (a touch sensation) and a sense of reception of vibration (a vibration sensation) can be presented to the user. For example, it is possible to reflect a speed at which a flying object collides with an operation target or a size or the like of the flying object and present various tactile sensations or new sensations such as a sense of force which the flying object applies to the operation target (a force sensation) in addition to a touch sensation or a vibration sensation to the user.

Modification Example of First Embodiment

In the first embodiment, the actuator 23 is configured to change the shape of the deformable interface 21 by a gas, as described above. However, the present technology is not limited thereto. The actuator 23 may be configured to change the shape of the deformable interface 21 by a liquid.

In the first embodiment, the deformable interface 21 is configured to include the actuator 23, as described above. However, the present technology is not limited thereto. The actuator 23 may be configured to be outside the deformable interface 21. That is, the deformable interface 21 may be configured not include the actuator 23.

In the first embodiment, the actuator 23 is configured to change the shape of the deformable interface 21 by a gas, as described above. However, the present technology is not limited thereto. The actuator 23 may be configured to change the shape of the deformable interface 21 by an electromagnetic force. That is, the actuator 23 may be an electromagnetic actuator. In this case, compared to a configuration in which the shape of the deformable interface 21 is changed by a fluid, it is possible to improve a response of control performed such that the shape of the deformable interface 21 is changed.

In the first embodiment, the temperature changing unit 22 is configured to be able to change a temperature by electrically adjusting a temperature, as described above. However, the present technology is not limited thereto. The temperature changing unit 22 may be configured to be able to change a temperature by moving a fluid (a liquid or the like) for adjusting the temperature.

Figure 5:
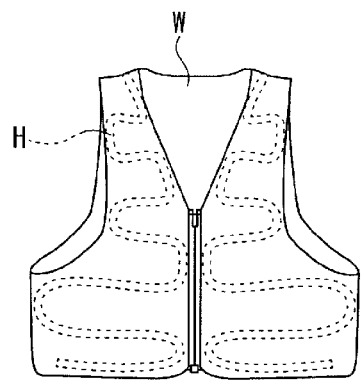
FIG. 5 is a diagram illustrating a modification example of the first embodiment.
Figure 6:
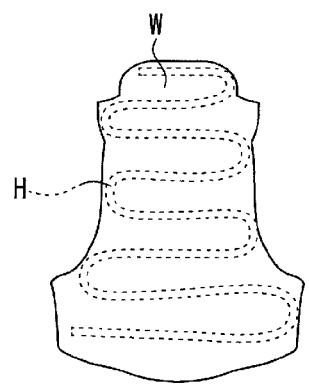
FIG. 6 is a diagram illustrating a modification example of the first embodiment.

In this case, for example, as illustrated in FIGS. 5 and 6, a hose H in which a fluid moves is disposed to pass through the positions at which the feedback units 2 of the clothing W are fitted.

In the first embodiment, the different environment is a video game in which an operation target is displayed on a display, as described above. However, the present technology is not limited thereto. The different environment may be a movie. In this case, the different environment output unit 4 is formed using, for example, a screen or the like of a movie theater. The operation target may be a person who appears in a movie.

In the first embodiment, the different environment is a video game in which an operation target is displayed on a display, as described above. However, the present technology is not limited thereto. The different environment may be an environment used for education software of a vocational training or the like. The environment used for education software of a vocational training or the like is, for example, a driving and operational training of a special vehicle, a training for an operation and maintenance of a facility or a machine, a safety education training, or a danger simulation training, or the like.

In the first embodiment, the different environment is a video game in which an operation target is displayed on a display, as described above. However, the present technology is not limited thereto. The different environment may be an environment used for a communication tool. The environment used for a communication tool is, for example, a releasing of a moving image generated using an avatar with a desired appearance (an operation target which is a user's self in the different environment), an interexchange event or the like with a person who is at a remote place.

Figure 7:
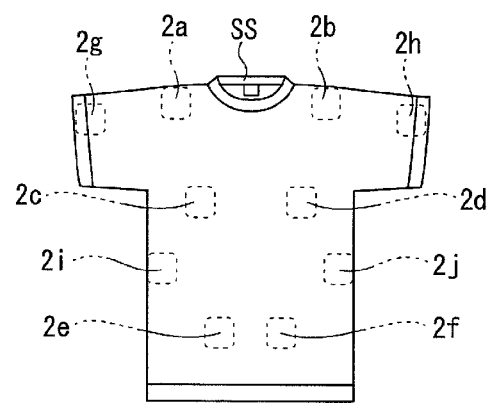
FIG. 7 is a diagram illustrating a modification example of the first embodiment.
Figure 8:
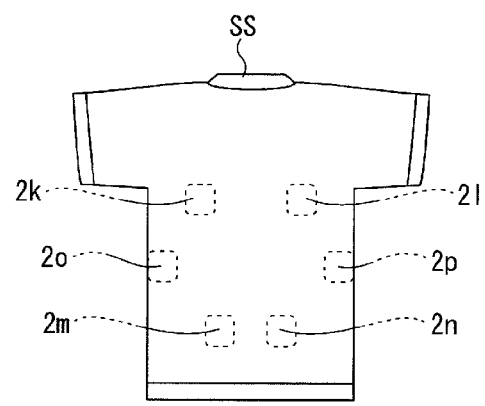
FIG. 8 is a diagram illustrating a modification example of the first embodiment.

In the first embodiment, the clothing W on which the feedback units 2 are fitted is a vest worn on the upper half part of the user. However, the present technology is not limited thereto. The clothing W may be, for example, a short-sleeve shirt SS, as illustrated in FIGS. 7 and 8. Similarly, the clothing W may be, for example, a long-sleeve shirt LS, as illustrated in FIGS. 9 and 10.

Figure 9:
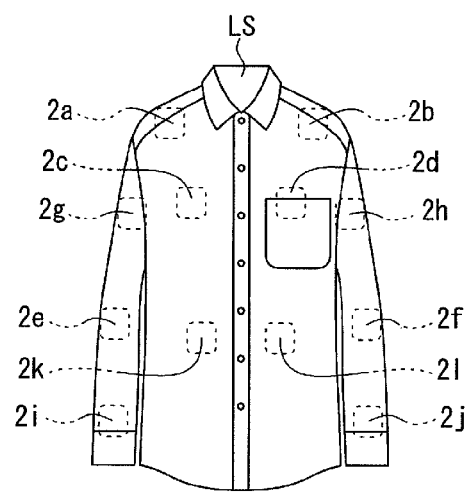
FIG. 9 is a diagram illustrating a modification example of the first embodiment.
Figure 10:
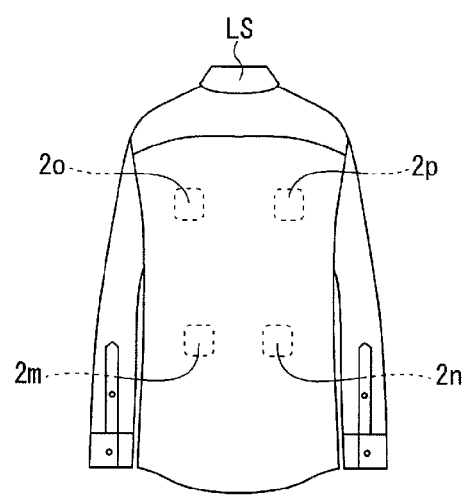
FIG. 10 is a diagram illustrating a modification example of the first embodiment.

In this case, as illustrated in FIGS. 9 and 10, the number of feedback units 2 may be 16. The number of feedback units 2 may be an integer-fold value of 8 in consideration of easiness of control.

Figure 11:
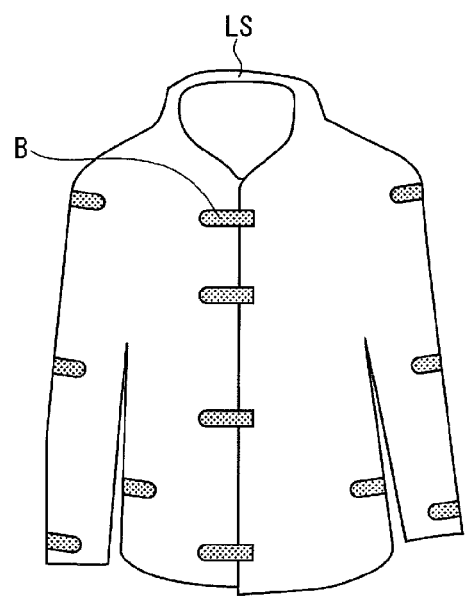
FIG. 11 is a diagram illustrating a modification example of the first embodiment.

In this case, as illustrated in FIG. 11, the long-sleeve shirt LS may be configured to include belt members B for fitting a waist, a wrist, or the like of the long-sleeve shirt LS to the body of the user.

Further, in this case, in addition to a touch sensation or a vibration sensation, it is possible to present various tactile sensations or new sensations such as a sense of tight fastening of a body by clothing to the user by fastening the belt members B (a fastening sensation).

As illustrated in FIGS. 9 and 10, when the number of feedback units 2 is set to 16, the feedback units 2 are disposed at positions facing, for example, arms (upper arms and forearms) of the user in addition to the shoulder, the chest, the abdomen, and the back of the user.

The number of feedback units 2 is not limited and the positions at which the feedback units 2 are disposed can be, for example, positions (the waist, the side, the flank, or the like) suitable for content of the different environment.

In the first embodiment, the clothing W on which the feedback units 2 are fitted is clothing (vest) worn on the upper half part of the user. However, the present technology is not limited thereto. The clothing W may be, for example, clothing (tights or the like) worn on the lower half part of the user. The clothing W on which the feedback units 2 are fitted may be clothing worn on the upper half part and the lower half part of the user.

In the first embodiment, the feedback computation unit 6 is configured to compute a control signal for controlling an operation of the actuator 23 and an operation of the temperature changing unit 22 in accordance with the different environment and a state of an operation target. However, the present technology is not limited thereto.

That is, for example, when an armor is worn as an operation target in the different environment, the deformable interfaces 21 disposed on parts (shoulder or the like) to which a load is applied to the body of the user by the armor may be further inflated earlier than the other deformable interfaces 21.

For example, when an operation target carries a backpack or the like on his or her back in the different environment, the deformable interfaces 21 disposed on portions (the shoulder, the waist, and the like) in which a load is applied to the body of the user may be inflated earlier than the other deformable interfaces 21.

In the first embodiment, the feedback units 2 including the deformable interfaces 21 and the temperature changing units 22 are disposed to pressurize the user at preset positions, but the present technology is not limited thereto. That is, for example, as illustrated in FIG. 12, a deformable member E which can be deformed in accordance with the physique of the user may be disposed between the deformable interface 21 and the temperature changing unit 22.

Figure 12:
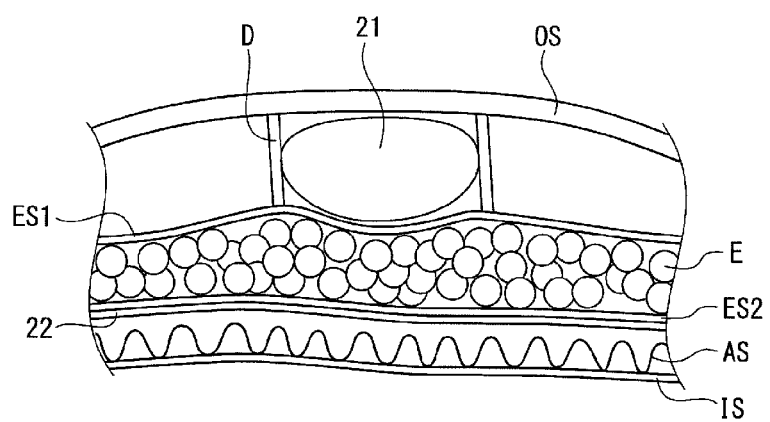
FIG. 12 is a diagram illustrating a modification example of the first embodiment.

In FIG. 12, a partition wall D that holds one deformable interface 21 is illustrated. The partition wall D forms a deformation regulation member that regulates deformation of the deformable interface 21 in a direction oriented along the surface of the body of the user.

In this case, for example, the deformable interface 21 is disposed between the outermost sheet member OS and a first elastic sheet member ES1. The temperature changing unit 22 is disposed between a second elastic sheet member ES2 and a heat insulation sheet member AS. An innermost sheet member IS is disposed between the heat insulation sheet member AS and the body of the user.

The outermost sheet member OS is formed of thick fabric with low elasticity. The first elastic sheet member ES1 is formed of sheer fabric with higher elasticity than the outermost sheet member OS. The second elastic sheet member ES2 is formed of sheer fabric with higher elasticity than the outermost sheet member OS. The heat insulation sheet member AS is formed of a urethane sheet. The innermost sheet member IS is formed of sheer fabric with higher elasticity than the outermost sheet member OS. The deformable member E is formed of, for example, a material with elasticity, such as a cushion configured in combination with beads or a gel-like material.

Accordingly, the heat insulation sheet member AS is disposed between the user and the temperature changing unit 22 and forms a thermal conductivity decreasing member that decreases thermal conductivity from the temperature changing unit 22 to the user.

Figure 13:
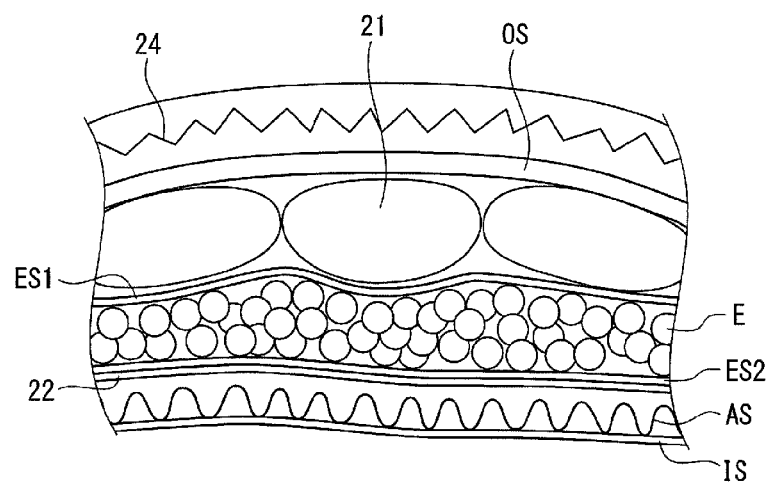
FIG. 13 is a diagram illustrating a modification example of the first embodiment.

As illustrated in FIG. 13, the plurality of deformable interfaces 21 may be disposed to be adjacent in a space formed between the outermost sheet member OS and the first elastic sheet member ES1.

As illustrated in FIG. 13, a vibration actuator 24 may be disposed outside of the outermost sheet member OS (a side away from the user).

The vibration actuator 24 is formed using, for example, a piezoelectric element and a vibration plate which are stacked and can feed vibration back to the user.

By using the configuration in which the vibration actuator 24 is disposed, the feedback computation unit 6 can perform the following computation, for example.

First, a case in which the different environment output from the different environment output unit 4 is an environment (a grass field or the like) where there is an object that is an extermination target (a harmful animal, an imaginary creature, or the like) and the operation target is a person who appears in a game will be described.

A case in which an operation target performs an operation of shooting a bullet toward an object that is an extermination target with a gun being carried and held with hands and a shoulder in the different environment will be described.

In this case, the feedback computation unit 6 first computes a control signal so that the deformable interfaces 21 disposed at a position facing the shoulder are inflated at a time point at which the operation target holds the gun with the hands and shoulder. Thereafter, when the operation target shoots a bullet, the feedback computation unit 6 computes the control signal so that the vibration actuators 24 operate. Thus, an impact of the shooting is fed as vibration back to the user.

As described above, the configuration of the deformable interfaces 21 is not limited to the configuration in which the deformable interfaces 21 are fitted on preset parts of the user. The deformable interfaces 21 may be fitted within a range including preset parts of the user. In this case, the feedback computation unit 6 may be configured so that, in a range in which the deformable interfaces 21 are fitted, control is performed to change the shapes of the deformable interfaces 21 in accordance with parts selected by the user or a change in a tactile sensation estimated to be obtained by the operation target.

Similarly, the configuration of the temperature changing units 22 is not limited to the configuration in which the temperature changing units 22 are fitted in preset parts of the user. The temperature changing units 22 may be fitted within a range including the preset parts of the user. In this case, the feedback computation unit 6 may be configured to perform control such that temperatures of the temperature changing units 22 are changed in accordance with parts selected by the user or a change in temperature estimated to be perceived by the operation target within the range in which the deformable interfaces 21 are fitted.

In the first embodiment, the electronic device 1 is configured to include the feedback unit 2, the general controller 3, the different environment output unit 4, the operation unit 5, and the feedback computation unit 6. However, the present technology is not limited thereto. That is, for example, the electronic device 1 may be configured to include only the feedback unit 2 including the deformable interface 21 and the temperature changing unit 22. In this case, the general controller 3, the different environment output unit 4, the operation unit 5, and the feedback computation unit 6 are included in, for example, a server or the like and wired or wireless communication is performed between the server and the electronic device 1.

In the first embodiment, the self-contained configuration in which the feedback unit 2, the general controller 3, the different environment output unit 4, the operation unit 5, and the feedback computation unit 6 are all worn on the body of the user has been realized. However, the present technology is not limited thereto. That is, for example, the server or the like may include the general controller 3, the different environment output unit 4, and the feedback computation unit 6. The server and the electronic device 1 may be configured to perform wired or wireless communication.

Accordingly, the actuator control unit 31 and the temperature control unit 32 may be configured to be outside (the exterior) of electronic device 1. Similarly, the feedback system 10 including the electronic device 1 may be configured so that the actuator control unit 31 and the temperature control unit 32 are outside (the exterior) of the electronic device 1.

Second Embodiment

<Configuration of Feedback System>

The feedback system 10 according to a second embodiment includes the electronic device 1 as in the feedback system 10 according to the first embodiment (see FIG. 1). In the following description, description of the same configuration as that of the above-described first embodiment will be omitted in some cases.

The feedback system 10 is a system that feeds a change in a tactile sensation and a change in temperature back to a user operating, in the actual environment, an operation target in a different environment. In the second embodiment, as in the first embodiment, a case in which the different environment is a game in which an operation target is displayed on a display will be described as an example.

<Configuration of Electronic Device>

The electronic device 1 includes the plurality of feedback units 2, the general controller 3, the different environment output unit 4, the operation unit 5, and the feedback computation unit 6 (see FIG. 1).

Figure 14:
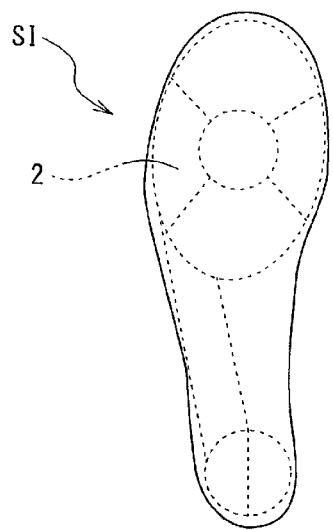
FIG. 14 is a plan view illustrating an insole to which an electronic device is applied according to a second embodiment.

The plurality of feedback units 2 are fitted on a surface (an upper surface) facing the sole of a foot of the user on an insole SI of a shoe worn by the user, as illustrated in FIG. 14.

In the second embodiment, a case in which eight feedback units 2 are fitted on the insole SI will be described.

Accordingly, the deformable interfaces 21 are disposed at position at which the sole of the foot of the user are pressurized and can pressurize the sole of the foot of the user.

The eight feedback units 2 are disposed in a region excluding the arch of the foot on the sole of the foot of the user.

Description of the configurations of the general controller 3, the different environment output unit 4, and the operation unit 5 will be omitted.

The feedback computation unit 6 computes a control signal for controlling an operation of the actuator 23 and an operation of the temperature changing unit 22 in accordance with the different environment output from the different environment output unit 4 and a state of an operation target operated using the operation unit 5.

Hereinafter, an example of computation performed by the feedback computation unit 6 will be described.

In the following description, a state in which the deformable interfaces 21 are inflated is assumed. In this case, the degree of the inflating of the deformable interfaces 21 is set to, for example, about 50%.

First, a case in which the different environment output from the different environment output unit 4 is an environment in which there are a dry ground and a muddy ground together and an operation target is a person who appears in a game will be described.

Then, a case in which the operation target moving under the different environment is moving from the dry ground to the muddy ground will be described.

In this case, the feedback computation unit 6 computes a control signal so that the inflated deformable interfaces 21 are contracted.

Next, a case in which the different environment output from the different environment output unit 4 is an environment in which there are a dry ground and a ground covered with snow together will be described.

Then, a case in which the operation target moving under the different environment is moving from the dry ground to the ground covered with snow will be described.

In this case, the feedback computation unit 6 computes a control signal so that the inflated deformable interfaces 21 are contracted.

In addition to this, feedback computation unit 6 computes a control signal so that the temperatures of the temperature changing units 22 decrease after the inflated deformable interfaces 21 are contracted.

Next, a case in which the different environment output from the different environment output unit 4 is an environment in which there are a desert and the shade of a tree together will be described.

Then, a case in which the operation target moving under the different environment is moving from the shade of the tree to the desert will be described.

In this case, the feedback computation unit 6 computes a control signal so that the inflated deformable interfaces 21 are contracted.

In addition to this, feedback computation unit 6 computes a control signal so that the temperatures of the temperature changing units 22 increase after the inflated deformable interfaces 21 are contracted.

Next, a case in which the different environment output from the different environment output unit 4 is an environment in which there are a dry ground and rock together will be described. Then, a case in which the operation target moving under the different environment is moving from the dry ground to the rock will be described.

In this case, the feedback computation unit 6 computes a control signal so that the inflated deformable interfaces 21 are further inflated.

Next, a case in which the different environment output from the different environment output unit 4 is a forest (a jungle) where withered leaves and branches are fallen on the ground will be described.

Then, a case in which the operation target moving under the different environment is stepping the branches fallen on the ground will be described.

In this case, the feedback computation unit 6 computes a control signal so that the deformable interfaces 21 disposed in a straight line are contracted.

Next, a case in which the different environment output from the different environment output unit 4 is an environment in which there are a dry ground and a decayed wooden bridge together will be described.

Then, a case in which the operation target moving under the different environment is moving from the dry ground to the bridge and then from the bridge to the dry ground will be described.

In this case, the feedback computation unit 6 computes a control signal so that the inflated deformable interfaces 21 are contracted at a timing at which the operation target is moving from the dry ground to the bridge. Thereafter, a control signal is computed so that the contracted deformable interfaces 21 are inflated at a timing at which the operation target is moving from the bridge to the dry ground.

As described above, the feedback computation unit 6 changes a tactile sensation fed back to the sole of the foot by changing a speed of the fluid supplied to the actuators 23 or a speed of the fluid discharged from the actuators 23 in accordance with an operation of the operation target under the different environment.

<Feedback Control Method>

Since a feedback control method according to the second embodiment is the same as the feedback control method according to the first embodiment, description thereof will be omitted.

In the configuration according to the second embodiment, it is possible to provide the electronic device 1 capable of feeding changes in a tactile sensation and a temperature occurring in the operation target under the different environment back to the sole of the foot of the user.

In the configuration according to the second embodiment, it is possible to provide the feedback system 10 including the electronic device 1 capable of feeding changes in a tactile sensation and a temperature occurring in the operation target under the different environment back to the sole of the foot of the user.

In the configuration according to the second embodiment, it is possible to provide a feedback control method using the electronic device 1 capable of feeding changes in a tactile sensation and a temperature occurring in the operation target under the different environment back to the sole of the foot of the user.

In the configuration according to the second embodiment, since the feedback units 2 are disposed in the region excluding the arch of the foot on the sole of the foot of the user, a sensation of inclining the foot toward the outside can be fed back to the user.

The feedback units 2 are disposed at positions corresponding to a shape of a bone (a metatarsal bone, or the like) of the foot in the sole of the foot of the user. Therefore, a small number of feedback units 2 can be used to feed a change in a tactile sensation occurring in the operation target under the different environment back to the sole of the foot of the user.

For example, by further inflating the deformable interface 21 disposed at a position facing the heel than the deformable interfaces 21 disposed at the different positions, it is possible to feed an interval at which the user wears shoes that have high heels (high-heeled shoes or the like) back to the user.

In the configuration according to the second embodiment, it is possible to perform different control on the feedback units 2 fitted on the insole SI of the shoe which the user wears on the right foot and the feedback units 2 fitted on the insole SI of the shoe which the user wears on the left foot. Thus, for example, it is possible to cause the user to misrecognize a sense of balance or feed an interval of movement on a slope surface of a slope way or the like back to the user.

In the configuration according to the second embodiment, by discharging the fluid from the actuators 23 in a short time, for example, it is possible to feed a tactile sensation of falling back to the sole of the foot of the user. By alternating the supply and discharge of the fluid to and from the actuators 23, for example, it is possible to feed a tactile sensation of vibration back to the sole of the foot of the user. Thus, by feeding the tactile sensation of falling and the tactile sensation of vibration back to the sole of the user, it is possible to feed a sense of cracking of an underfoot floor surface on which the user is walking or a sense of falling of the underfoot floor surface back to the user.

In the configuration according to the second embodiment, by outputting an outdoor (a city area, a forest, or the like) as the different environment and installing a facility such as a handrail which can be held by the user in the actual environment, for example, it is possible to provide a new environment different from the actual environment to a walking training or a rehabilitation back to the sick and the wounded or the like.

In the configuration according to the second embodiment, the shapes of the deformable interfaces 21 are changed by the fluid. Therefore, for example, when the different environment is an environment in which withered leaves, branches, and the like are fallen on the ground, it is possible to present the user various tactile sensations or new sensations such as a sense of unevenness of the ground (an unevenness sensation) in addition the touch sensation or the vibration sensation. For example, when the different environment is an environment in which there are a dry ground and a muddy ground together, it is possible to present the user various tactile sensations or new sensations such as a sense of feeling a difference in hardness (a softness and hardness sensation) of the ground in addition to the touch sensation or the vibration sensation.

Modification Example of Second Embodiment

Figure 15:
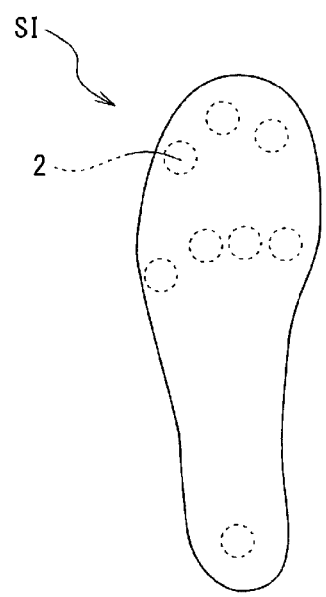
FIG. 15 is a diagram illustrating a modification example of the second embodiment.

In the second embodiment, the feedback units 2 are disposed in the region excluding the arch of the foot on the sole of the foot of the user, as described above. However, the present technology is not limited thereto. That is, for example, as illustrated in FIG. 15, the feedback units 2 may be disposed on a region facing the heel, the toes, a ball of the foot, or the like on the sole of the foot of the user.

Figure 16:
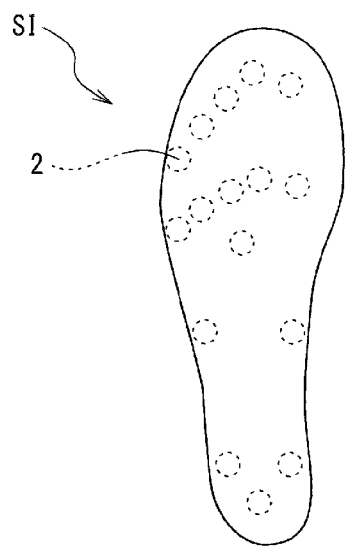
FIG. 16 is a diagram illustrating a modification example of the second embodiment.
Figure 17:
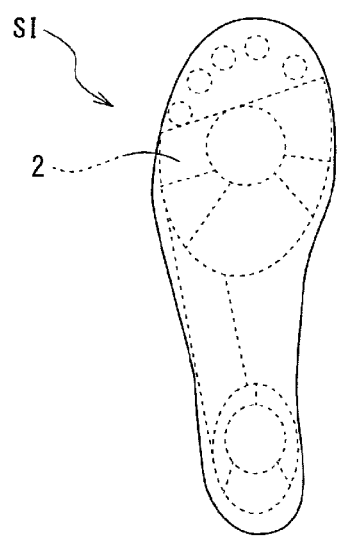
FIG. 17 is a diagram illustrating a modification example of the second embodiment.
Figure 18:
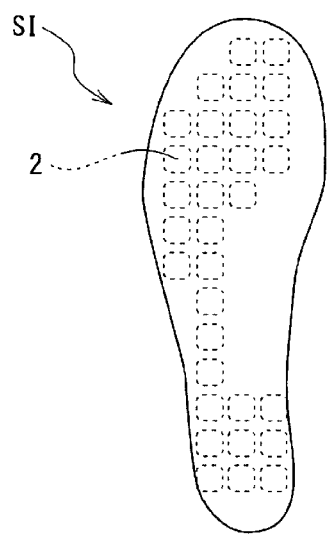
FIG. 18 is a diagram illustrating a modification example of the second embodiment.
Figure 19:
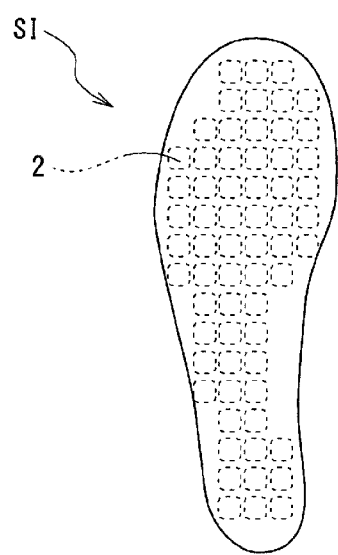
FIG. 19 is a diagram illustrating a modification example of the second embodiment.

In the second embodiment, the number of feedback units 2 is 8, as described above. However, the present technology is not limited thereto. The number of feedback units 2 may be, for example, 16 as illustrated in FIGS. 16 and 17. The number of feedback units 2 may be 32, for example, as illustrated in FIG. 18, or may be 64, for example, as illustrated in FIG. 19.

In the second embodiment, the feedback units 2 are fitted on the insole SI. However, the present technology is not limited thereto. The feedback units 2 may be fitted on the upper surface of a footrest FT, for example, as illustrated in FIG. 20.

Figure 20:
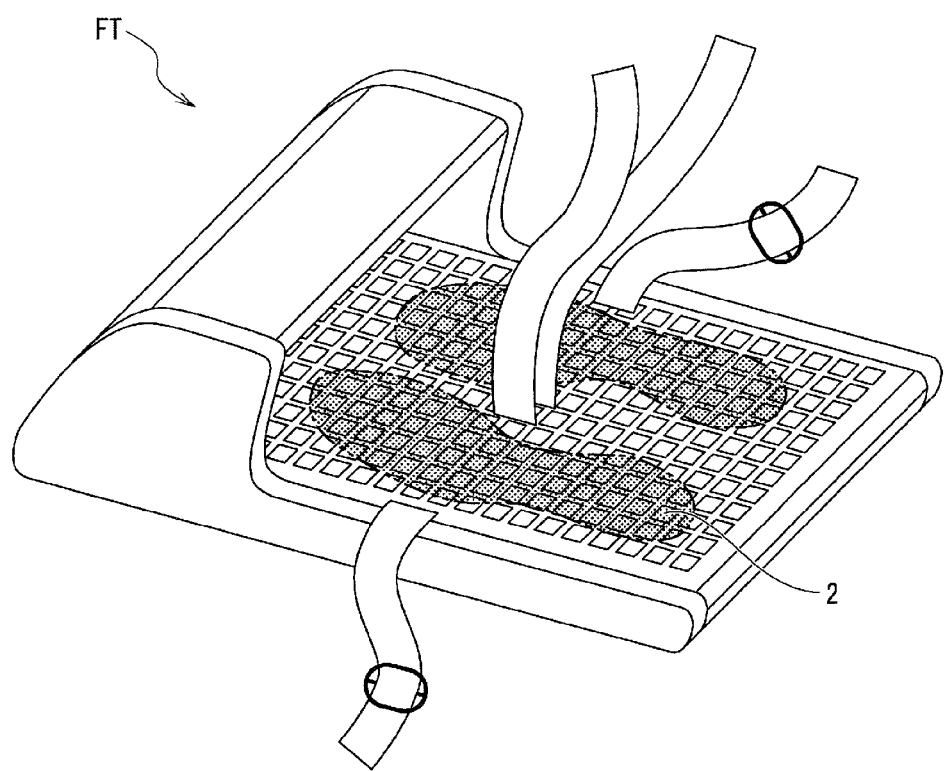
FIG. 20 is a diagram illustrating a modification example of the second embodiment.

In this case, as illustrated in FIG. 20, by providing fixation bands for fixing the feet of the user to any positions in the footrest FT, it is possible to feed the changes in the tactile sensation and the temperature occurring in the operation target under the different environment back to appropriate positions on the soles of the feet of the user.

Figure 21:
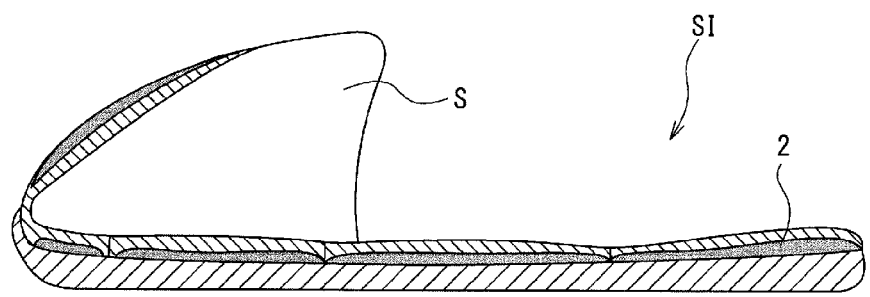
FIG. 21 is a diagram illustrating a modification example of the second embodiment.
Figure 22:
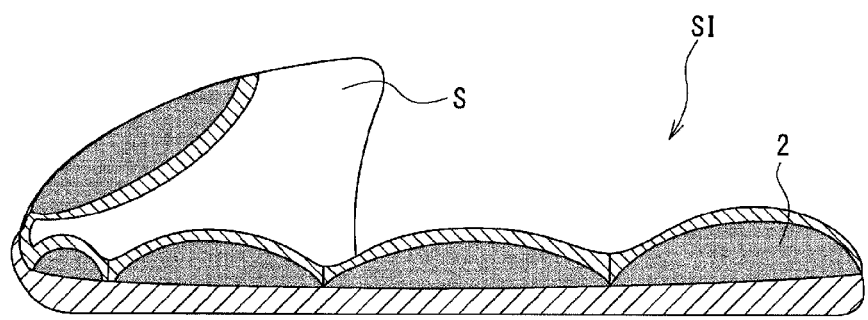
FIG. 22 is a diagram illustrating a modification example of the second embodiment.
Figure 23:
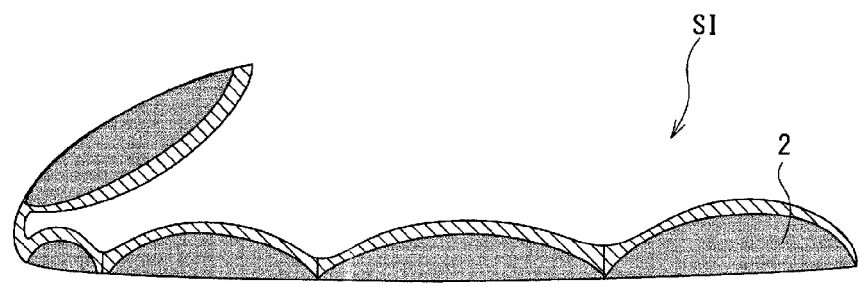
FIG. 23 is a diagram illustrating a modification example of the second embodiment.

In the second embodiment, the feedback units 2 are disposed at the positions facing the sole of the foot of the user. However, the present technology is not limited thereto. For example, as illustrated in FIGS. 21 to 23, the feedback units 2 may be disposed at positions facing the top of a foot of the user. FIG. 21 illustrates a state in which the deformable interfaces 21 are deflated and FIG. 22 illustrates a state in which the deformable interfaces 21 are inflated. FIGS. 21 and 22 illustrate states in which the insole SI is fitted in a shoe S which the user wears.

In this case, for example, by further inflating the feedback unit 2 disposed at the position facing the top of a foot than the feedback unit 2 disposed at the position facing the positions facing the sole of the foot, for example, it is possible to feed back a sense of catching the foot with a hand emerging from the ground.

Accordingly, for example, when the different environment is a place in which a ball is kicked (a soccer ground or the like) and the user performs an operation of kicking a ball as a player, control may be performed such that the feedback unit 2 disposed at the position facing the top of a foot of the user is inflated.

Third Embodiment

<Configuration of Feedback System>

The feedback system 10 according to a third embodiment includes the electronic device 1 as in the feedback system 10 according to the first embodiment (see FIG. 1). In the following description, description of the same configuration as that of the above-described first embodiment will be omitted in some cases.

The feedback system 10 is a system that feeds a change in a tactile sensation and a change in temperature back to a user operating, in the actual environment, an operation target in a different environment. In the third embodiment, as in the first embodiment, a case in which the different environment is a game in which an operation target is displayed on a display will be described as an example.

<Configuration of Electronic Device>

The electronic device 1 includes the plurality of feedback units 2, the general controller 3, the different environment output unit 4, the operation unit 5, and the feedback computation unit 6 (see FIG. 1).

Figure 24:
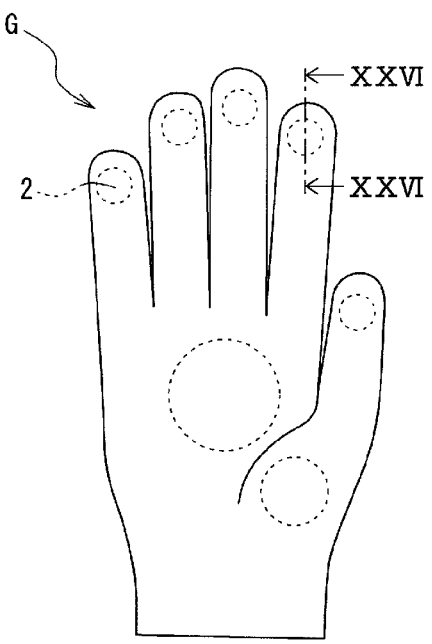
FIG. 24 is a diagram illustrating a glove to which an electronic device is applied when viewed from the palm of a hand according to a third embodiment.
Figure 25:
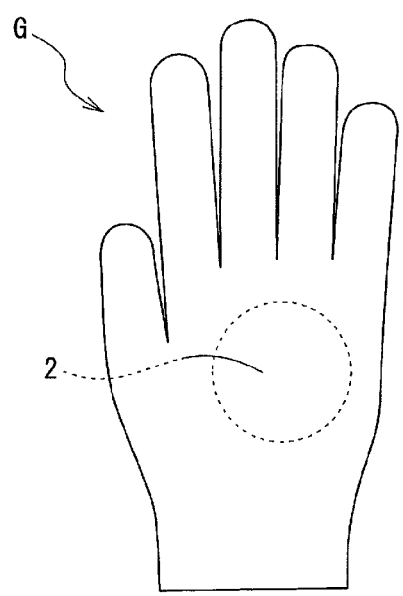
FIG. 25 is a diagram illustrating a glove to which an electronic device is applied when viewed from the back of a hand according the third embodiment.

The plurality of feedback units 2 are fitted on the inner surface (a surface facing a hand of a user) of a glove G which the user wears on both hands, as illustrated in FIGS. 24 and 25. In the following description, to distinguish right and left hands from each other, the glove G which the user wears on the right hand is referred to as a "right glove GR" and the glove G which the user wears on the left hand is referred to as a "left glove GL" in some cases.

Accordingly, the deformable interfaces 21 are disposed at positions at which the hand of the user is pressurized and can pressurize the hand of the user.

In the third embodiment, a case in which eight feedback units 2 are fitted on the glove G will be described.

The eight feedback units 2 are disposed at five positions facing fingertips, a position facing the base of the thumb, a position facing the center of a palm, and a position facing the center of the back of the hand in the hand of the user.

Figure 26:
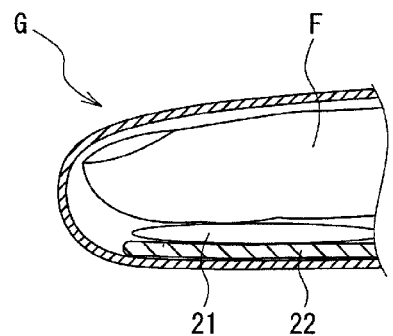
FIG. 26 is a cross-sectional view along the line XXVI-XXVI line of FIG. 24.

The deformable interface 21 included in the feedback unit 2 is disposed closer to the hand (a finger) of the user than the temperature changing unit 22 included in the feedback unit 2, as illustrated in FIG. 26. In FIG. 26, a finger F of the user on which the glove G is worn is illustrated for description.

Description of the configurations of the general controller 3, the different environment output unit 4, and the operation unit 5 will be omitted.

The feedback computation unit 6 computes a control signal for controlling an operation of the actuator 23 and an operation of the temperature changing unit 22 in accordance with the different environment output from the different environment output unit 4 and a state of an operation target operated using the operation unit 5.

Hereinafter, an example of computation performed by the feedback computation unit 6 will be described.

In the following description, a state in which the deformable interface 21 is contracted is assumed.

First, a case in which the different environment output from the different environment output unit 4 is an environment in which a cup with hot water is put on a table and an operation target is a person who appears in a game will be described.

Then, a case in which an operation of holding the cup with hot water with his or her hand is performed under the different environment will be described.

In this case, the feedback computation unit 6 computes a control signal so that only the deformable interfaces 21 disposed at the positions facing the fingertips are inflated.

In addition to this, the feedback computation unit 6 computes a control signal so that the temperatures of the temperature changing units 22 disposed at the positions facing the fingertip increase.

Next, a case in which the different environment output from the different environment output unit 4 is an environment in which there are a grass field and a lake together will be described. Then, a case in which an operation target sitting on the grass field performs an operation of getting his or her hand into the lake under the different environment will be described.

In this case, the feedback computation unit 6 computes a control signal so that the deformable interfaces 21 disposed at the positions facing the fingertips are inflated and then the remaining deformable interfaces 21 are inflated.

In addition to this, the feedback computation unit 6 computes a control signal so that the temperatures of the temperature changing units 22 disposed at the positions facing the fingertips decrease and then the temperatures of the remaining temperate changing units 22 decrease.

Next, a case in which the different environment output from the different environment output unit 4 is an environment in which an operation target imitating another person (an enemy character) is near an operation target operated by the user (an own character) will be described.

Then, a case in which the enemy character strikes the own character with the fist, and then an operation is performed in such a manner that the own character receives the strike with the right hand and holds the striking arm of the enemy character with the left hand under the different environment will be described.

In this case, the feedback computation unit 6 computes a control signal so that the deformable interface 21 disposed at the position facing the center of the palm is inflated among the deformable interfaces 21 fitted on the right glove GR. Thereafter, a control signal is computed so that the deformable interfaces 21 disposed at the positions facing the base of the thumb and the center of the palm are inflated among the deformable interfaces 21 fitted on the left glove GL. Further, the feedback computation unit 6 computes a control signal so that the deformable interfaces 21 disposed at the positions facing the fingertips are inflated among the deformable interfaces 21 fitted on the left glove GL.

In addition to this, the feedback computation unit 6 computes a control signal so that the deformable interface 21 disposed at the position facing the center of the palm is inflated among the deformable interfaces 21 fitted on the right glove GR, and then the temperature of the inflated temperature changing unit 22 increases. Further, a control signal is computed so that the deformable interfaces 21 disposed at the positions facing the base of the thumb and the center of the palm are inflated among the deformable interfaces 21 fitted on the left glove GL, and then the temperatures of the inflated temperature changing units 22 increase.

Further, a control signal is computed so that the deformable interfaces 21 disposed at the positions facing the fingertips are inflated among the deformable interfaces 21 fitted on the left glove GL, and then the temperatures of the inflated temperature changing units 22 increase.

Next, a case in which the different environment output from the different environment output unit 4 is an environment in which a cup with hot water and a cup with ice and water are put on a table will be described.

Then, a case in which an operation of holding the cup with the hot water with the right hand holding the cup with ice and water with the left hand is performed under the different environment will be described.

In this case, the feedback computation unit 6 computes a control signal so that only the deformable interfaces 21 disposed at the positions facing the fingertips are inflated among the deformable interfaces 21 fitted on the right glove GR. In addition to this, a control signal is computed so that only the deformable interfaces 21 disposed at the positions facing the fingertips are inflated among the deformable interfaces 21 fitted on the left glove GL. Further, the feedback computation unit 6 computes a control signal so that the deformable interfaces 21 disposed at the positions facing the fingertips are inflated among the deformable interfaces 21 fitted on the right glove GR, and then the temperatures of the inflated temperature changing units 22 increase. Further, a control signal is computed so that the deformable interfaces 21 disposed at the positions facing the fingertips are inflated among the deformable interfaces 21 fitted on the left glove GL, and then the temperatures of the inflated temperature changing units 22 decrease.

<Feedback Control Method>

Since a feedback control method according to the third embodiment is the same as the feedback control method according to the first embodiment, description thereof will be omitted.

In the configuration according to the third embodiment, it is possible to provide the electronic device 1 capable of feeding changes in a tactile sensation and a temperature occurring in the operation target under the different environment back to the hands (both hands or one hand) of the user.

In the configuration according to the third embodiment, it is possible to provide the feedback system 10 including the electronic device 1 capable of feeding changes in a tactile sensation and a temperature occurring in the operation target under the different environment back to the hands (both hands or one hand) of the user.

In the configuration according to the third embodiment, it is possible to provide a feedback control method using the electronic device 1 capable of feeding changes in a tactile sensation and a temperature occurring in the operation target under the different environment back to the hands (both hands or one hand) of the user.

In the configuration according to the third embodiment, the shapes of the deformable interfaces 21 are changed by the fluid. Therefore, for example, when the different environment is an environment in which another character imitating another person is near an operation target operated by the own character and the own character performs, for example, an operation of holding an arm or the like of the other character in the different environment, it is possible to present the user various tactile sensations or new sensations such as a sense of holding a creature (a creature holding sensation) in addition the touch sensation or the vibration sensation.

Modification Example of Third Embodiment

Figure 27:
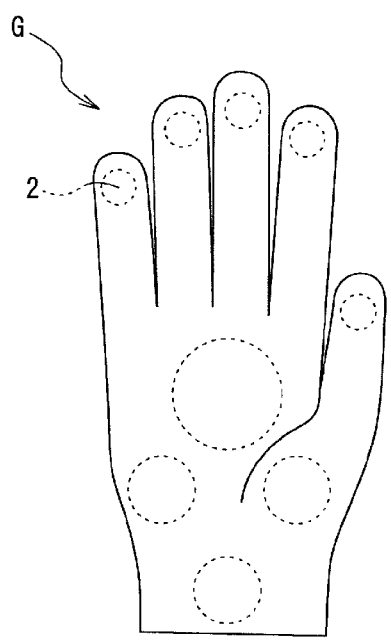
FIG. 27 is a diagram illustrating a modification example of the third embodiment.
Figure 28:
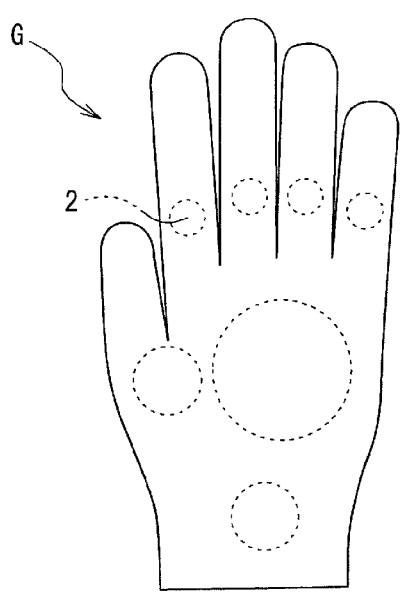
FIG. 28 is a diagram illustrating a modification example of the third embodiment.

In the third embodiment, the number of feedback units 2 is 8, as described above. However, the present technology is not limited thereto. The number of feedback units 2 may be, for example, 16 as illustrated in FIGS. 27 and 28.

In this case, in addition to the positions facing the fingertips, the base of the thumb, the center of the palm and the center of the back of the hand, for example, the feedback units 2 are disposed at positions facing a near portion of the wrist to the palm, a near portion of the wrist to the back of the hand, the base of the thumb on the back of the hand, and second joints of the fingers except for the thumb.

Figure 29:
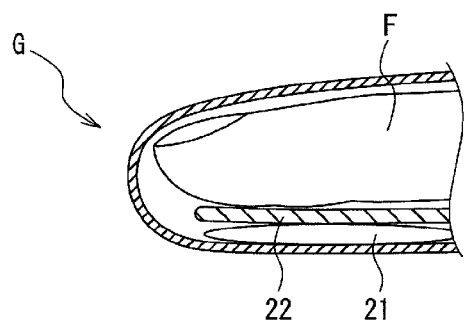
FIG. 29 is a diagram illustrating a modification example of the third embodiment.

In the third embodiment, the deformable interfaces 21 are disposed on the side closer to the user than the temperature changing units 22, as described above. However, the present technology is not limited thereto. For example, as illustrated in FIG. 29, the temperature changing units 22 may be disposed on the side closer to the user than the deformable interfaces 21.

Figure 30:
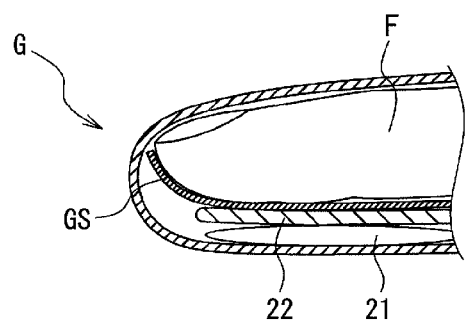
FIG. 30 is a diagram illustrating a modification example of the third embodiment.

In this case, for example, as illustrated in FIG. 30, a protective sheet GS disposed between the temperature changing unit 22 and the hand (finger) of the user may be included. Thus, even when the temperature of the temperature changing unit 22 is increased, it is possible to inhibit a low temperature burn or the like from occurring.

Accordingly, the protective sheet GS is disposed between the user and the temperature changing unit 22 and a thermal conductivity decreasing member that decreases thermal conductivity from the temperature changing unit 22 to the user is formed.

Figure 31:
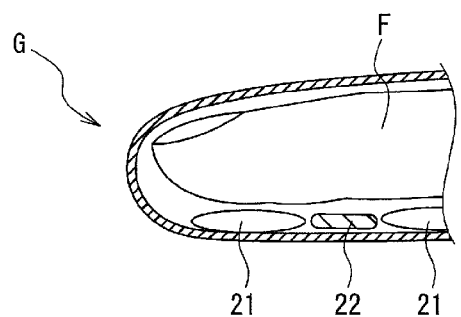
FIG. 31 is a diagram illustrating a modification example of the third embodiment.

In the third embodiment, the deformable interface 21 is disposed on the side closer to the user than the temperature changing unit 22, as described above. However, the present technology is not limited thereto. For example, as illustrated in FIG. 31, the deformable interface 21 and the temperature changing unit 22 may be disposed at the same distance with respect to the user.

Figure 32:
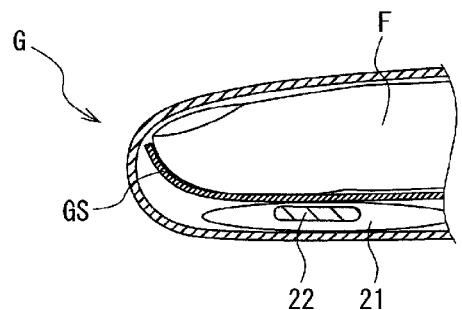
FIG. 32 is a diagram illustrating a modification example of the third embodiment.

In the third embodiment, the deformable interface 21 is disposed on the side closer to the user than the temperature changing unit 22, as described above. However, the present technology is not limited thereto. For example, as illustrated in FIG. 32, the temperature changing unit 22 may be contained inside the deformable interface 21. Thus, compared to a configuration in which the temperature changing unit 22 is disposed on the side closer to the user than the deformable interface 21, it is possible to feed the deformation of the deformable interface 21 back to the user more easily.

In this case, for example, as illustrated in FIG. 32, the protective sheet GS disposed between the temperature changing unit 22 and the hand (finger) of the user may be included.

Figure 33:
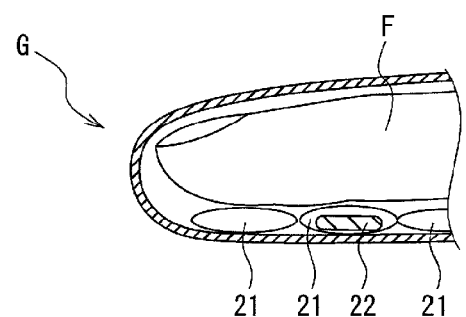
FIG. 33 is a diagram illustrating a modification example of the third embodiment.

In the third embodiment, the deformable interface 21 is disposed on the side closer to the user than the temperature changing unit 22, as described above. However, the present technology is not limited thereto. That is, for example, as illustrated in FIG. 33, the temperature changing unit 22 may be contained inside the deformable interface 21. Further, the temperature changing unit 22 may be fixed to the inner surface of the glove G. Thus, the deformable interface 21 has a function of protecting the user from the temperature of the temperature changing unit 22. Even when the temperature changing unit 22 is increased, it is possible to inhibit a low temperature burn or the like from occurring.

Fourth Embodiment

<Configuration of Feedback System>

The feedback system 10 according to a fourth embodiment includes the electronic device 1 as in the feedback system 10 according to the first embodiment (see FIG. 1). In the following description, description of the same configuration as that of the above-described first embodiment will be omitted in some cases.

The feedback system 10 is a system that feeds a change in a tactile sensation and a change in temperature back to a user operating, in the actual environment, an operation target in a different environment. In the fourth embodiment, as in the first embodiment, a case in which the different environment is a game in which an operation target is displayed on a display will be described as an example.

<Configuration of Electronic Device>

The electronic device 1 includes the plurality of feedback units 2, the general controller 3, the different environment output unit 4, the operation unit 5, and the feedback computation unit 6 (see FIG. 1).

The plurality of feedback units 2 are fitted in the clothing W, the insole SI, and the gloves G (the right glove GR and the left glove GL) (see FIGS. 2 to 4, 14 to 23, and 24 to 33).

Accordingly, the deformable interfaces 21 are disposed at the positions at which the upper half part of the user, the sole of the foot of the user, and the hands of the user are pressurized, and thus can pressurize the upper half part, the sole of the foot, and the hands of the user.

Description of the configurations of the general controller 3, the different environment output unit 4, and the operation unit 5 will be omitted.

The feedback computation unit 6 computes a control signal for controlling an operation of the actuator 23 and an operation of the temperature changing unit 22 in accordance with the different environment output from the different environment output unit 4 and a state of an operation target operated using the operation unit 5.

Hereinafter, an example of computation performed by the feedback computation unit 6 will be described.

First, a case in which the different environment output from the different environment output unit 4 is a bathroom where a bathtub with warm water is put and an operation target is a person who appears in a game will be described. In the following description, it is assumed that the deformable interfaces 21 are contracted and the temperatures of the temperature changing units 22 are the room temperature.

A case in which a user performs an operation of soaking from the parts of the toes in the bathtub under the different environment will be described.

In this case, the feedback computation unit 6 computes a control signal so that the deformable interfaces 21 disposed on the insole SI, the deformable interfaces 21 disposed on the clothing W, and the deformable interfaces 21 disposed on the gloves G are inflated in this order.

Control for inflating the deformable interfaces 21 disposed on the insole SI is performed, for example, in order from the deformable interfaces 21 disposed at positions facing the parts of the toes which are starting points to the deformable interfaces 21 disposed at positions facing the heels.

Control for inflating the deformable interfaces 21 disposed on the clothing W is performed, for example, in order from the deformable interfaces 21 disposed at positions facing the waist which is a starting point to the deformable interfaces 21 disposed at positions facing the shoulder.

Control for inflating the deformable interfaces 21 disposed on the gloves G is performed, for example, in order from the deformable interfaces 21 disposed at positions facing the fingertips which are starting points to the deformable interfaces 21 disposed at positions facing the sides close to the wrists.

In addition to this, the feedback computation unit 6 computes a control signal so that temperatures increase in the order of the temperature changing units 22 disposed on the insole SI, the temperature changing units 22 disposed on the clothing W, and the temperature changing units 22 disposed on the gloves G.

Control for increasing the temperatures of the temperature changing units 22 disposed on the insole SI is performed, for example, in order from the temperature changing units 22 disposed at positions facing the parts of the toes which are starting points to the temperature changing units 22 disposed at positions facing the heels.

Control for increasing the temperatures of the temperature changing units 22 disposed on the clothing W is performed, for example, in order from the temperature changing units 22 disposed at positions facing the waist which is a starting point to the temperature changing units 22 disposed at positions facing the shoulder.

Control for increasing the temperatures of the temperature changing units 22 disposed on the gloves G is performed, for example, in order from the temperature changing units 22 disposed at positions facing the fingertips which are starting points to the temperature changing units 22 disposed at positions facing parts close to the wrists.

Next, a case in which the different environment output from the different environment output unit 4 is an environment in which there is a building in a desert will be described. In the following description, it is assumed that the deformable interfaces 21 are inflated by about 50% and the temperatures of the temperature changing units 22 are the room temperature. Then, a case in which an operation target moving under the different environment is coming out from the building and is moving to the desert will be described.

In this case, the feedback computation unit 6 computes a control signal so that only the deformable interfaces 21 disposed on the insole SI are contracted.

In addition to this, the feedback computation unit 6 computes a control signal so that the temperatures of the temperature changing units 22 disposed on the clothing W and the gloves G increase. Further, the feedback computation unit 6 computes a control signal so that the deformable interfaces 21 disposed on the insole SI are contracted, and then the temperatures of the temperature changing units 22 disposed on the insole SI and the temperatures of the temperature changing units 22 disposed on the clothing W and the gloves G increase.

Next, a case in which the different environment output from the different environment output unit 4 is an environment (a battlefield or the like) in which arrows, bullets, artillery balls, and the like cross will be described. In the following description, it is assumed that the deformable interfaces 21 are contracted and the temperatures of the temperature changing units 22 are the room temperature.

Then, a case in which an artillery ball is landed to the ground on the right side of the operation target and exploded in the different environment will be described.

In this case, the feedback computation unit 6 computes a control signal so that the deformable interfaces 21 disposed on the right glove GR, the deformable interfaces 21 disposed on the clothing W and the insole SI, and the deformable interfaces 21 disposed on the left glove GL are inflated in this order.

Control for inflating the deformable interfaces 21 disposed on the clothing W is performed, for example, in order from the deformable interfaces 21 disposed at positions facing the right shoulder which are starting points to the deformable interfaces 21 disposed at positions facing the left shoulder.

In addition to this, the feedback computation unit 6 computes a control signal so that temperatures increase in the order of the temperature changing units 22 disposed on the right glove GR, the temperature changing units 22 disposed on the clothing W and the insole SI, and the temperature changing units 22 disposed on the left glove GL.

Control for increasing the temperatures of the temperature changing units 22 disposed on the clothing W is performed, for example, in order from the deformable interfaces 21 disposed at positions facing the right shoulder which are starting points to the deformable interfaces 21 disposed at positions facing the left shoulder.

Next, a case in which the different environment output from the different environment output unit 4 is a dry ground on which a bonfire is made will be described. In the following description, it is assumed that the deformable interfaces 21 are contracted and the temperatures of the temperature changing units 22 are the room temperature.

Then, a case in which a user sitting on the ground is pushing out the palms of both hands toward the bonfire under the different environment will be described.

In this case, the feedback computation unit 6 computes a control signal so that only the deformable interfaces 21 disposed on the insole SI are inflated.

In addition to this, the feedback computation unit 6 computes a control signal so that temperatures increase in the order of the temperature changing units 22 disposed on the gloves G, the temperature changing units 22 disposed on the insole SI, and the temperature changing units 22 disposed on the clothing W.

Control for increasing the temperature changing units 22 disposed on the gloves G is performed in the order of the temperature changing units 22 disposed at positions facing the palm of the hand and the temperature changing units 22 disposed at positions facing the back of the hand.

Next, a case in which the different environment output from the different environment output unit 4 is an environment in which there is a building in a desert will be described. In the following description, it is assumed that the deformable interfaces 21 are inflated by about 50% and the temperatures of the temperature changing units 22 are the room temperature. Then, a case in which an operation target operated by another user is in a building and an operation target operated by an own user is coming out from the building and moving to the desert will be described.

In this case, the feedback computation unit 6 computes a control signal so that only the deformable interfaces 21 disposed on the insole SI are contracted.

In addition to this, the feedback computation unit 6 computes a control signal so that the temperatures of the temperature changing units 22 disposed on the clothing W and the gloves G increase. Further, the feedback computation unit 6 computes a control signal so that the deformable interfaces 21 disposed on the insole SI are contracted, and then the temperatures of the temperature changing units 22 disposed on the insole SI and the temperatures of the temperature changing units 22 disposed on the clothing W and the gloves G increase. At this time, the feedback computation unit 6 computes a control signal so that the temperatures of the temperature changing units 22 worn by the own user are higher than the temperatures of the temperature changing units worn by the other user.

Next, a case in which the different environment output from the different environment output unit 4 is a coastline will be described. In the following description, it is assumed that the deformable interfaces 21 are contracted and the temperatures of the temperature changing units 22 are the room temperature.

Then, a case in which an operation target performs an operation of diving into the sea from the parts of the toes and further holding an object sinking on the bottom of the sea under the different environment will be described.

In this case, the feedback computation unit 6 computes a control signal so that the deformable interfaces 21 disposed on the insole SI, the deformable interfaces 21 disposed on the gloves G, and the deformable interfaces 21 disposed on the clothing W are inflated in this order when the operation target is diving into the sea.

In addition to this, the feedback computation unit 6 computes a control signal so that a temperature decreases in the order of the temperature changing units 22 disposed on the insole SI, the temperature changing units 22 disposed on the gloves G, and the temperature changing units 22 disposed on the clothing W when the operation target is diving into the sea.

Further, the feedback computation unit 6 computes a control signal so that only the deformable interfaces 21 disposed on the insole SI are further inflated when the operation target diving into the sea reaches the bottom of the sea.

Then, when the operation target moving on the bottom of the sea is performing an operation of holding an object sinking on the bottom of the sea, a control signal is computed so that the deformable interfaces 21 disposed on the glove G is further inflated.

<Feedback Control Method>

Since a feedback control method according to the fourth embodiment is the same as the feedback control method according to the first embodiment, description thereof will be omitted.

In the configuration according to the fourth embodiment, it is possible to provide the electronic device 1 capable of feeding changes in a tactile sensation and a temperature occurring in the operation target under the different environment back to the upper half part, the sole of the foot, and the hands of the user.

In the configuration according to the fourth embodiment, it is possible to provide the feedback system 10 including the electronic device 1 capable of feeding changes in a tactile sensation and a temperature occurring in the operation target under the different environment back to the upper half part, the sole of the foot, and the hands of the user.

In the configuration according to the fourth embodiment, it is possible to provide a feedback control method using the electronic device 1 capable of feeding changes in a tactile sensation and a temperature occurring in the operation target under the different environment back to the upper half part, the sole of the foot, and the hands of the user.

Modification Example of Fourth Embodiment

In the fourth embodiment, the feedback units 2 are fitted on the clothing W, the insole SI, and the gloves G, as described above. However, the present technology is not limited thereto. The feedback units 2 may be further fitted on a member (goggles or the like) facing the head. In this case, for example, the different environment is a place (a soccer ground or the like) in which a ball is headed. When a user performs an operation of heading a ball as a player, control may be performed to inflate the feedback units 2 disposed at positions facing the head of the user.

For example, when the operation target is wearing a helmet in the different environment, the deformable interfaces 21 disposed at positions facing the head to which a load is applied on the body of the user due to the helmet may be further inflated than the other deformable interfaces 21.

Fifth Embodiment

<Configuration of Feedback System>

Figure 34:
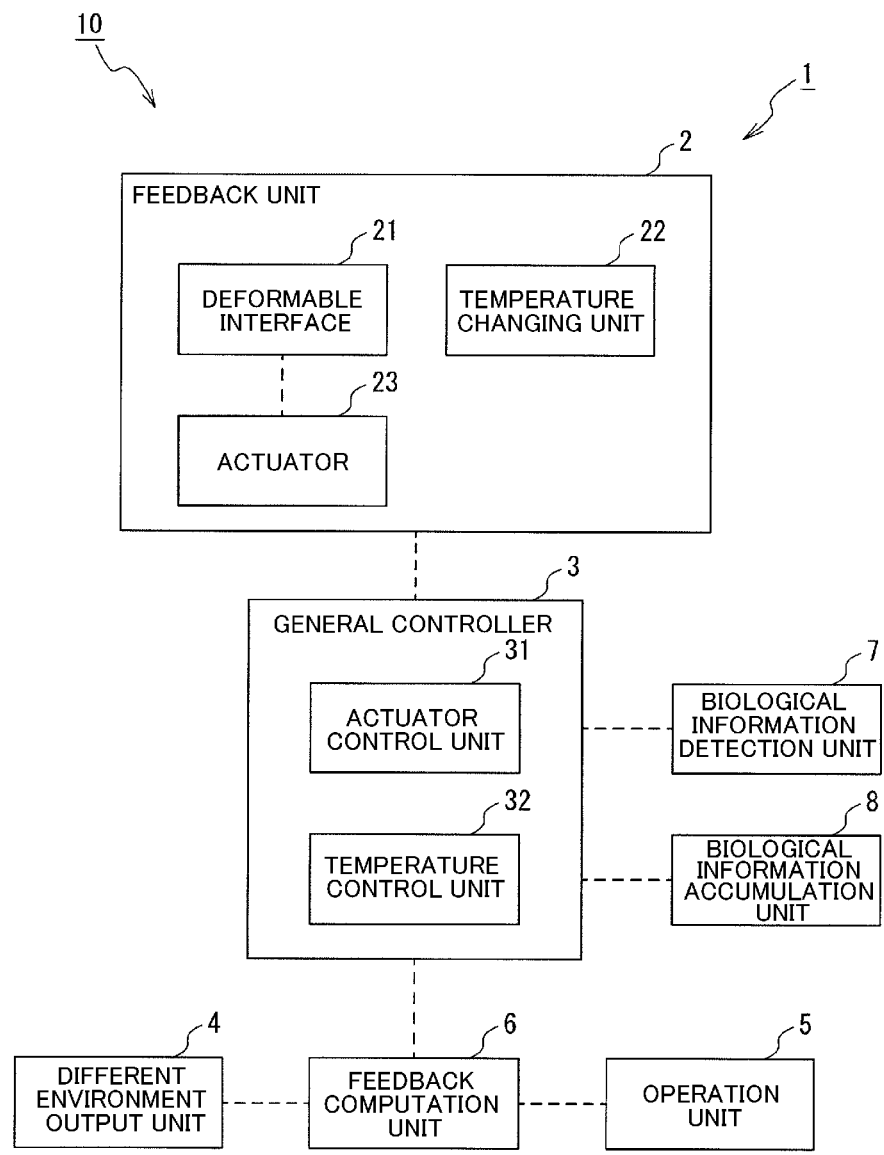
FIG. 34 is a block diagram illustrating configurations of an electronic device and a feedback system according to a fifth embodiment.

The feedback system 10 according to a fifth embodiment includes the electronic device 1, as illustrated in FIG. 34.

The feedback system 10 is a system that feeds a change in a tactile sensation and a change in temperature back to a user operating, in the actual environment, an operation target in a different environment. In the fifth embodiment, a case in which the different environment is a game (a video game) in which an operation target is displayed on a display will be described as an example.

<Configuration of Electronic Device>

As illustrated in FIG. 34, the electronic device 1 includes the plurality of feedback units 2, the general controller 3, the different environment output unit 4, the operation unit 5, a biological information detection unit 7, a biological information accumulation unit 8, and the feedback computation unit 6. In FIG. 34, only one of the plurality of feedback units 2 is illustrated.

The plurality of feedback units 2 are fitted on, for example, the clothing W (see FIGS. 2 to 4). Description of the configurations of the general controller 3, the different environment output unit 4, and the operation unit 5 will be omitted.

The biological information detection unit 7 detects biological information of the user. In the fifth embodiment, a case in which the biological information detection unit 7 is formed using a plurality of electrodes fitted on a head-mounted display will be described. The plurality of electrodes form a brain wave sensor that detects brain waves as biological information of the user. As the biological information of the user, a cerebral blood flow, a heart rate, a breath, a sweat rate, a blood pressure, a body temperature, a magnitude of a spoken voice, or the like of the user can also be adopted. The biological information detection unit 7 may be, for example, an image sensor that acquires a facial image (an expression) of the user. When a body temperature of the user is used as the biological information of the user, the biological information of the user may be detected in accordance with a change in the temperature of the temperature changing unit 22, for example, by decreasing and correcting a detected value of the body temperature of the user in accordance with an increase amount of increased temperature of the temperature changing unit 22.

The biological information accumulation unit 8 accumulates a change amount of the biological information detected by the biological information detection unit 7 to correspond to a situation of the different environment. Further, when the change amount of the biological information detected by the biological information detection unit 7 exceeds a change amount threshold, the biological information accumulation unit 8 stores a situation in which the change amount exceeds the change amount threshold in association with a change amount threshold.

Here, the change amount threshold may be set in advance. The change amount accumulated in the biological information accumulation unit 8 may be associated with a use history of the feedback system 10 or the electronic device 1 by the user and the change amount threshold may be automatically changed and set for each user in accordance with the accumulated change amount and the use history.

Specifically, when a heart rate of the user is considerably changed compared to another situation (a normal walking or the like) and exceeds a change amount threshold in a situation in which a large object has abruptly been fallen or a building has collapsed before the eyes of the user, a change amount of the heart rate is accumulated in association with a situation under the different environment.

The feedback computation unit 6 computes a control signal for controlling an operation of the actuator 23 and an operation of the temperature changing unit 22 in accordance with the different environment output from the different environment output unit 4 and a state of the operation target operated using the operation unit 5.

In addition to this, the feedback computation unit 6 computes a control signal in accordance with a situation in which the user operates the operation target, a change amount of the biological information detected by the biological information detection unit 7, and a change amount of the biological information accumulated in the biological information accumulation unit 8.

Hereinafter, an example of computation performed by the feedback computation unit 6 will be described.

A case in which the different environment output from the different environment output unit 4 is a city area in a rainstorm and an operation target is a person who appears in a game will be described. In the following description, it is assumed that the user has experienced a similar situation a plurality of times.

Then, a case in which a large signboard has fallen before the eyes of the operation target in the different environment will be described.

In this case, the feedback computation unit 6 determines whether the situation in which the large signboard has fallen before the eyes of the operation target (an occurrence situation) is a situation stored in association with the change amount threshold in the biological information accumulation unit 8.

Further, when the occurrence situation is determined to be the situation stored in association with the change amount threshold in the biological information accumulation unit 8, a control signal is computed so that an operation of the actuator 23 is controlled with a change amount greater than that of a situation in which the change amount is equal to or less than the change amount threshold.

In addition to this, a control signal is computed so that the temperatures of the temperature changing units 22 increases with the change amount greater than that of the situation in which the change amount is equal to or less than the change amount threshold.

As described above, when a situation in which the user operates the operation target is a situation in which the change amount exceeds the change amount threshold, the actuator control unit 31 controls an operation of the actuator 23 with a change amount greater than that of a situation in which the change amount is equal to or less than the change amount threshold. When a situation in which the user operates the operation target is a situation in which the change amount exceeds the change amount threshold, the temperature control unit 32 controls a temperature of the temperature changing unit 22 with a change amount greater than that of a situation in which the change amount is equal to or less than the change amount threshold.

<Feedback Control Method>

In a feedback control method performed using the feedback system 10 according to the fifth embodiment, an operation of the actuator 23 is controlled so that a change in a tactile sensation occurring in the operation target under the different environment is fed back to the user. In addition to this, the temperature of the temperature changing unit 22 is controlled such that the change in the temperature occurring in the operation target under the different environment is fed back to the user.

Further, when a situation in which the user operates the operation target is a situation in which the change amount exceeds the change amount threshold, an operation of the actuator 23 is controlled with a change amount greater than that of the situation in which the change amount is equal to or less than the change amount threshold. In addition to this, when a situation in which the user operates the operation target is a situation in which the change amount exceeds the change amount threshold, the temperature of the temperature changing unit 22 is controlled with a change amount greater than that of the situation in which the change amount is equal to or less than the change amount threshold.

In the configuration according to the fifth embodiment, it is possible to provide the electronic device 1 capable of feeding changes in a tactile sensation and a temperature back to the user with the greater change amount when a situation in which the user is impressed or surprised, or the like under the different environment are accumulated and the different environment becomes the accumulated situation.

In the configuration according to the fifth embodiment, it is possible to provide the feedback system 10 including the electronic device 1 capable of feeding the changes in the tactile sensation and the temperature with the great change amount back to the user when the different environment becomes a situation in which the user is impressed or surprised, or the like.

In the configuration according to the fifth embodiment, it is possible to provide the feedback control method using the electronic device 1 capable of feeding the changes in the tactile sensation and the temperature with the great change amount back to the user when the different environment is the accumulated situation in which the different environment becomes a situation in which the user is impressed or surprised, or the like.

Other Embodiments

As described above, the embodiments of the present technology have been described, but the description and drawings which are part of the present disclosure are not construed to limit the present technology. It should be apparent to those skilled in the art that various substitutions, embodiments, and operational technologies of the present disclosure can be made.

In addition, various embodiments not described herein, such as any applied configuration of each configuration described in the foregoing embodiments can be, of course, included in the present technology. Accordingly, the technical scope of the present technology is determined by only specific inventive factors related to the claims appropriate from the foregoing description.

The feedback system, the feedback control method, and the electronic device according to the present disclosure may not include all of the constituent elements described in the foregoing embodiments or the like. In contrast, other constituent elements may be included. The advantageous effects described in the present specification are merely exemplary and are not limited, and other advantageous effects may be achieved.

The present technology can be configured as follows.

(1)

A feedback system including:

a deformable interface configured to be able to pressurize a part of a user operating, in an actual environment, an operation target moving in a different environment;

an actuator control unit configured to control an operation of an actuator changing a shape of the deformable interface;

a temperature changing unit configured to be able to change a temperature perceived by the part of the user; and a temperature control unit configured to control a temperature of the temperature changing unit, wherein the actuator control unit controls the operation of the actuator based on a change in a tactile sensation estimated to be obtained by the operation target, and the temperature control unit controls a temperature of the temperature changing unit based on a change in temperature estimated to be perceived by the operation target.

(2)

A feedback control method including:

controlling an operation of an actuator that changes a shape of a deformable interface that is able to pressurize a part of a user operating, in an actual environment, an operation target moving in a different environment based on a change in a tactile sensation estimated to be obtained by the operation target; and controlling a temperature of a temperature changing unit that is able to change a temperature perceived by the part of the user based on a change in temperature estimated to be perceived by the operation target.

(3)

An electronic device including:

one or more deformable interfaces of which a shape is changeable; and one or more temperature changing units of which a temperature is changeable, wherein the deformable interface is able to pressurize a part of a user operating, in an actual environment, an operation target moving in a different environment, and the temperature changing unit is able to change a temperature perceived by the part of the user.

(4)

The electronic device according to (3), further including:

an actuator control unit configured to control an operation of an actuator that changes the shape of the deformable interface based on a change in a tactile sensation estimated to be obtained by the operation target; and a temperature control unit configured to control the temperature of the temperature changing unit based on a change in temperature estimated to be perceived by the operation target.

(5)

The electronic device according to (3) or (4), wherein the temperature of the temperature changing unit is able to be changed by electrically adjusting a temperature.

(6)

The electronic device according to any one of (3) to (5), further including:

a plurality of feedback units including the single deformable interface and the single temperature changing unit that are capable of operating in connection with each other.

(7)

The electronic device according to any one of (4) to (6), wherein the actuator is a fluid actuator.

(8)

The electronic device according to any one of (3) to (7), wherein the temperature changing unit is disposed at a position closer to the user than the deformable interface.

(9)

The electronic device according to any one of (3) to (8), further including:

a deformable member that has elasticity, wherein the deformable member is deformable in accordance with a physique of the user.

(10)

The electronic device according to any one of (3) to (9), further including:

a thermal conductivity decreasing member configured to decrease thermal conductivity of a temperature generated by the temperature changing unit, wherein the thermal conductivity decreasing member is disposed between the user and the temperature changing unit.

(11)

The electronic device according to any one of (3) to (10), wherein at least one of the deformable interfaces is able to pressurize an upper half part of the user.

(12)

The electronic device according to any one of (3) to (11), wherein at least one of the deformable interfaces and at least one of the temperature changing units are fitted on clothing.

(13)

The electronic device according to any one of (3) to (12), wherein at least one of the deformable interfaces and at least one of the temperature changing units are able to pressurize a front surface and a rear surface of the upper half part, respectively.

(14)

The electronic device according to any one of (3) to (13), wherein at least one of the deformable interfaces is able to pressurize a sole of a foot of the user.

(15)

The electronic device according to any one of (3) to (14), wherein at least one of the deformable interfaces and at least one of the temperature changing units are fitted on an insole of a shoe.

(16)

The electronic device according to any one of (3) to (15), wherein at least one of the deformable interfaces is able to pressurize a hand of the user.

(17)

The electronic device according to any one of (3) to (16), wherein at least one of the deformable interfaces and at least one of the temperature changing units are fitted on a glove.

(18)

The electronic device according to any one of (3) to (17), further including:

a different environment output unit configured to output the different environment; and an operation unit used to operate the operation target.

(19)

The electronic device according to any one of (3) to (18), further including:
- a plurality of the deformable interfaces;
- a plurality of the temperature changing units;
- an actuator control unit configured to control an operation of an actuator that changes a shape of the deformable interface based on a change in a tactile sensation estimated to be obtained by the operation target; and
- a temperature control unit configured to control a temperature of the temperature changing unit based on a change in temperature estimated to be perceived by the operation target, wherein
the actuator control unit individually controls an operation of the actuator changing the shapes of the plurality of deformable interfaces at different timings, and
the temperature control unit individually controls the temperatures of the plurality of temperature changing units at different timings.

(20)

The electronic device according to any one of (3) to (19), further including:
- a biological information detection unit configured to detect biological information of the user; a biological information accumulation unit configured to accumulate a change amount of the biological information detected by the biological information detection unit to correspond to a situation under the different environment;
- an actuator control unit configured to control an operation of an actuator that changes a shape of the deformable interface based on a change in a tactile sensation estimated to be obtained by the operation target; and
- a temperature control unit configured to control a temperature of the temperature changing unit based on a change in temperature estimated to be perceived by the operation target, wherein,
when the change amount of the biological information detected by the biological information detection unit exceeds a change amount threshold, the biological information accumulation unit stores a situation in which the change amount exceeds the change amount threshold in association with the change amount threshold,
when a situation in which the user is operating the operation target is the situation in which the change amount exceeds the change amount threshold, the actuator control unit controls an operation of the actuator by a change amount greater than in a situation in which the change amount is equal to or less than the change amount threshold, and
when the situation in which the user is operating the operation target is the situation in which the change amount exceeds the change amount threshold, the temperature control unit controls the temperature of the temperature changing unit by a change amount greater than in the situation in which the change amount is equal to or less than the change amount threshold.

(21)

The electronic device according to any one of (3) to (20), wherein a temperature of the temperature changing unit is able to be changed by moving a fluid for adjusting the temperature.

(22)

The electronic device according to any one of (4) to (6), wherein the actuator is an electromagnetic actuator.

(23)

The electronic device according to any one of (3) to (22), further including:
- a plurality of feedback units including the single deformable interface and the single temperature changing unit that are capable of operating in connection with each other, wherein
two of the plurality of feedback units are disposed at positions interposing the upper half part of the user in the front and rear directions.

(24)

The electronic device according to any one of (3) to (23), further including:
- an actuator control unit configured to control an operation of the actuator that changes a shape of the deformable interface based on a change in a tactile sensation estimated to be obtained by the operation target; and
- a temperature control unit configured to control a temperature of the temperature changing unit based on a change in temperature estimated to be perceived by the operation target, wherein
the temperature control unit controls a temperature of the temperature changing unit after the actuator control unit controls the operation of the actuator.

(25)

The electronic device according to any one of (3) to (24), wherein the plurality of feedback units are included and the number of the plurality of feedback units is an integer-fold value of 8.

(26)

The electronic device according to any one of (3) to (25), further including:
- an actuator control unit configured to control an operation of the actuator based on a change in a tactile sensation estimated to be obtained by the operation target, wherein
the actuator control unit further inflates the deformable interface disposed in a part to which a load is applied on the body of the user than the other deformable interfaces in advance in accordance with a member on which the operation target is mounted in the different environment.

(27)

The electronic device according to any one of (3) to (26), further including:
- a deformation regulation member configured to regulate deformation of the deformable interface.

(28)

The electronic device according to any one of (3) to (27), further including:
- a vibration actuator configured to feed vibration back to the user.

(29)

The electronic device according to any one of (3) to (28), wherein at least one of the deformable interfaces and at least one of the temperature changing units are fitted on a footrest on which the user puts his or her feet.

(30)

The electronic device according to any one of (3) to (29), wherein at least one of the deformable interfaces is able to pressurize a top of a foot of the user.

(31)

The electronic device according to any one of (3) to (29), wherein at least one of the deformable interfaces is able to pressurize the head of the user.

(32)

The electronic device according to any one of (3) to (31), wherein at least one of the deformable interfaces and at least one of the temperature changing units are mounted on the head of the user.

REFERENCE SIGNS LIST

1 Electronic device
2 Feedback unit
21 Deformable interface
22 Temperature changing unit
23 Actuator
24 Vibration actuator
3 General controller
31 Actuator control unit
32 Temperature control unit
4 Different environment output unit
5 Operation unit
6 Feedback computation unit
7 Biological information detection unit
8 Biological information accumulation unit
10 Feedback system
W Clothing
H Hose
SS Short-sleeve shirt
LS Long-sleeve shirt
B Belt member
E Deformable member
D Partition wall
OS Outermost sheet member
ES1 First elastic sheet member
ES2 Second elastic sheet member
AS Heat insulation sheet member
IS Innermost sheet member
SI Insole
FT Footrest
S Shoe
G Glove
F Finger
GS Protection sheet

The invention claimed is:

1. A feedback system comprising:
a deformable interface configured to be able to apply pressure to a part of a user operating, in an actual environment, an operation target moving in a different environment;
an actuator control unit configured to control an operation of an actuator changing a shape of the deformable interface;
a temperature changing unit configured to be able to change a temperature of the deformable interface; and
a temperature control unit configured to control a temperature of the temperature changing unit, wherein
the actuator control unit is configured to control the operation of the actuator based on a change in a tactile sensation estimated to be obtained by the operation target,
the temperature control unit is configured to control the temperature of the temperature changing unit based on a change in temperature estimated to be perceived by the operation target, and
a deformable member that has elasticity between the deformable interface and the temperature changing unit, wherein the deformable member is deformable in accordance with a physique of the user.

2. A feedback control method comprising:
controlling an operation of an actuator that changes a shape of a deformable interface that is able to apply pressure to a part of a user, in an actual environment, operating an operation target moving in a different environment based on a change in a tactile sensation estimated to be obtained by the operation target,
controlling a temperature of a temperature changing unit that is able to change a temperature of the deformable interface based on a change in temperature estimated to be perceived by the operation target, and
a deformable member that has elasticity between the deformable interface and the temperature changing unit, wherein the deformable member is deformable in accordance with a physique of the user.

3. An electronic device comprising:
a deformable interface of which a shape is changeable; and
a temperature changing unit which is connected to the deformable interface, wherein
the deformable interface is able to apply pressure a part of a user operating, in an actual environment, an operation target moving in a different environment,
the temperature changing unit is able to change a temperature of the deformable interface, and
a deformable member that has elasticity between the deformable interface and the temperature changing unit, wherein the deformable member is deformable in accordance with a physique of the user.

4. The electronic device according to claim 3, further comprising:
an actuator control unit configured to control an operation of an actuator that changes the shape of the deformable interface based on a change in a tactile sensation estimated to be obtained by the operation target; and
a temperature control unit configured to control the temperature of the temperature changing unit based on a change in temperature estimated to be perceived by the operation target.

5. The electronic device according to claim 3, wherein the temperature of the temperature changing unit is able to be changed electrically.

6. The electronic device according to claim 3, further comprising:
a plurality of feedback units, wherein each of the plurality of feedback units includes the deformable interface and the temperature changing unit, and wherein the plurality of feedback units are capable of operating in connection with each other.

7. The electronic device according to claim 4, wherein the actuator comprises a fluid actuator.

8. The electronic device according to claim 3, wherein temperature changing unit is at a position closer to the user than the deformable interface.

9. The electronic device according to claim 3, further comprising:
a thermal conductivity decreasing member configured to decrease thermal conductivity of a temperature generated by the temperature changing unit, wherein
the thermal conductivity decreasing member is between the user and the temperature changing unit.

10. The electronic device according to claim 3, wherein the deformable interface is able to apply pressure to a part of an upper body of the user.

11. The electronic device according to claim 10, wherein the deformable interface and the temperature changing unit are on clothing.

12. The electronic device according to claim 10, wherein the deformable interface is able to apply pressure to a front surface of the part of the upper body and the deformable interfaces is able to apply pressure to a rear surface of the part of the upper body.

13. The electronic device according to claim 3, wherein the deformable interface is able to apply pressure to a sole of a foot of the user.

14. The electronic device according to claim 13, wherein the deformable interface and the temperature changing unit are on an insole of a shoe.

15. The electronic device according to claim 3, wherein the deformable interface is able to apply pressure to a hand of the user.

16. The electronic device according to claim 15, wherein the deformable interface and the temperature changing unit are on a glove.

17. The electronic device according to claim 3, further comprising:
a different environment output unit configured to output the different environment; and
an operation unit used to operate the operation target.

18. The electronic device according to claim 3, comprising:
a plurality of deformable interfaces;
a plurality of temperature changing units;
an actuator control unit configured to control an operation of a plurality of actuators that each change a shape of a respective deformable interface based on a change in a tactile sensation estimated to be obtained by the operation target; and
a temperature control unit configured to control a temperature of each of the plurality of temperature changing units based on a respective change in temperature estimated to be perceived by the operation target,
wherein
the actuator control unit is configured to individually control an operation of the actuator changing the shapes of the plurality of deformable interfaces at different timings, and
the temperature control unit is configured to individually control each of the temperatures of the plurality of temperature changing units at different timings.

19. The electronic device according to claim 3, further comprising:
a biological information detection unit configured to detect biological information of the user;
a biological information accumulation unit configured to accumulate a change amount of the biological information detected by the biological information detection unit to correspond to a situation under the different environment;
an actuator control unit configured to control an operation of an actuator that changes a shape of the deformable interface based on a change in a tactile sensation estimated to be obtained by the operation target; and
a temperature control unit configured to control a temperature of the temperature changing unit based on a change in temperature estimated to be perceived by the operation target,
wherein,
in response to the change amount of the biological information detected by the biological information detection unit exceeding a change amount threshold, the biological information accumulation unit stores a situation in which the change amount exceeds the change amount threshold in association with the change amount threshold,
when a situation in which the user is operating the operation target is the situation in which the change amount exceeds the change amount threshold, the actuator control unit controls an operation of the actuator by a change amount greater than in a situation in which the change amount is equal to or less than the change amount threshold, and
when the situation in which the user is operating the operation target is the situation in which the change amount exceeds the change amount threshold, the temperature control unit controls the temperature of the temperature changing unit by a change amount greater than in the situation in which the change amount is equal to or less than the change amount threshold.

20. The electronic device according to claim 3, wherein the deformable member that has elasticity comprises a cushion configured in combination with a plurality of beads or a gel-like material.

* * * * *